US008566232B2

(12) United States Patent
Bater

(10) Patent No.: US 8,566,232 B2
(45) Date of Patent: Oct. 22, 2013

(54) METHOD AND APPARATUS FOR ORGANISING FINANCIAL DATA

(75) Inventor: Paul Bater, Swansea (GB)

(73) Assignee: Bankclarity Jersey Group Limited, St. Helier (GB)

( * ) Notice: Subject to any disclaimer, the term of this patent is extended or adjusted under 35 U.S.C. 154(b) by 1144 days.

(21) Appl. No.: 11/662,329

(22) PCT Filed: Sep. 9, 2005

(86) PCT No.: PCT/GB2005/003509
§ 371 (c)(1),
(2), (4) Date: Mar. 8, 2007

(87) PCT Pub. No.: WO2006/027617
PCT Pub. Date: Mar. 16, 2006

(65) Prior Publication Data

US 2012/0166324 A1 Jun. 28, 2012

(30) Foreign Application Priority Data

Sep. 9, 2004 (GB) .................................. 0420033.3

(51) Int. Cl.
*G06Q 40/00* (2012.01)

(52) U.S. Cl.
USPC ............................................... 705/39; 705/35

(58) Field of Classification Search
USPC ..................................................... 705/35, 39
See application file for complete search history.

(56) References Cited

U.S. PATENT DOCUMENTS 5,764,736 A * 6/1998 Shachar et al. ............ 379/93.09
5,930,778 A * 7/1999 Geer ............................... 705/45
6,078,924 A * 6/2000 Ainsbury et al. ..................... 1/1
6,249,770 B1 * 6/2001 Erwin et al. .................... 725/35
6,968,316 B1 * 11/2005 Hamilton .................... 705/36 R
7,716,093 B2 * 5/2010 Johnson et al. ................. 705/31
2002/0055952 A1 * 5/2002 Clancey et al. ............... 707/504
2002/0152166 A1 * 10/2002 Dutta et al. ...................... 705/43
2003/0204460 A1 * 10/2003 Robinson et al. ............... 705/35
2003/0212617 A1 * 11/2003 Stone et al. ...................... 705/30
2007/0226093 A1 * 9/2007 Chan et al. ....................... 705/35

FOREIGN PATENT DOCUMENTS

WO WO 97/14108 4/1997
WO WO 2004/053776 6/2004

OTHER PUBLICATIONS

Fern, Richard H; "The brief Career of Carly Hennessey: a look at the economics of pop music"; Journal of the International Academy for Case Studies; 2004; ISSN: 1078-4950.*
M2_Presswire; "MyBusiness unveils new range of software with a host of unique features . . . "; Jan 28, 2003; Supplier No. 96966509.*
Business Wire; "IMNET Systems, Inc. and Compucare Form Business Partnership"; Sep. 3, 1997; Supplier No. 19725137.*

* cited by examiner

*Primary Examiner* — Edward Chang
(74) *Attorney, Agent, or Firm* — Jackson Walker L.L.P.; Christopher J. Rourk

(57) ABSTRACT

A method of organizing financial data is described in which financial data is obtained from one or more data source and imported into a computer program. The data may, for example, be bank account data obtained from a bank via a wireless connection. The computer program modifies the data so obtained into a format suitable for presentation to a user. At least some of said electronic data is obtained without being manually entered by an operator.

35 Claims, 27 Drawing Sheets

BankClarity for The Nomates Property Group

Clarify bank entries - 123456

30 April 2004

| Date | Details | | Amount |
|---|---|---|---|
| 3/03/04 | CREDIT | | 1,587.49 |

*40*

Heading — Contact — *42*
Bank Interest — No Contact
Capital Allowances
Capital Expenditure — 587.49 — *52*
Capital Raised — 87.50
Cash Transfers
Casual Labour — Clarify — *44*
Drawings
Finance Charges
Insurances
Legal & Professional Costs 17.50% ▼ — *54*

| Heading | Contact | Net | VAT | Total |
|---|---|---|---|---|
| Cash Transfers | No Contact | 1,000.00 | 0.00 | 1,000.00 |

Return to this statement    Total : 1,000.00

Side menu:
- 22 — Bank Accounts
- 24 — Review Statements
  - Add a new entry
  - Amend entry
  - Delete entry
  - Clarify entry
  - Print bank statement
  - Select A/C to Review
  - Search entry
  - UNclarify entries
  - UNclarify ALWAYS
- 26 — Historical Clarity
- 28 — Future Clarity
- 30 — Report Designer
- 32 — Contact Manager
- 34 — User Maintenance

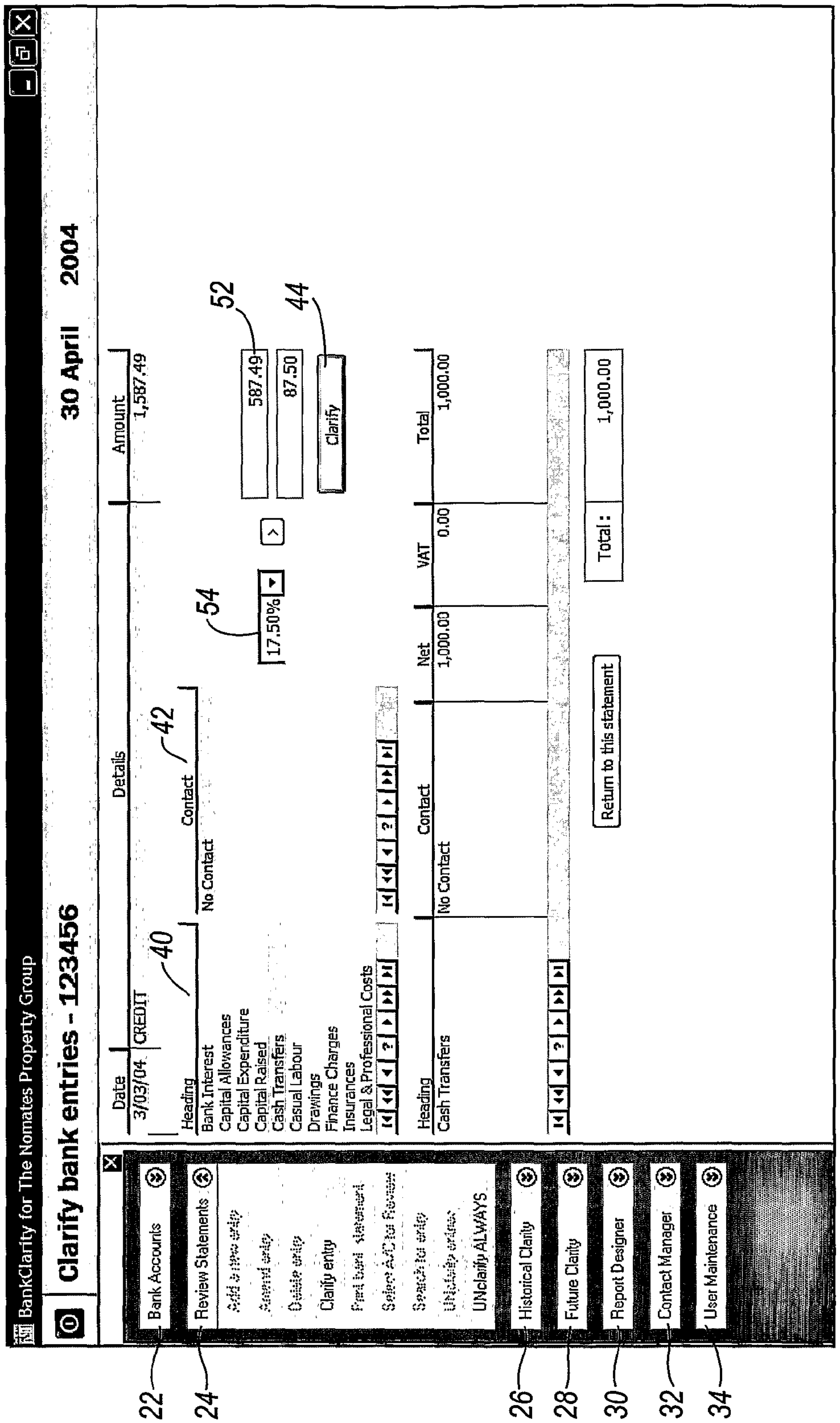

*Fig. 14*

W E Nomates T/A Billy (Account No : 123456)

Display
- [ ] ALL entries   [ ] Clarified ONLY   [ ] Unclarified ONLY   [✓] Cheques only
  36a              36b                 36c                   36d Unclarified entries
41
38

| Date | Details | Amount | Balance |
|------|---------|--------|---------|
| 21/08/03 | 000061 | (4,950.00) | |
| 28/08/03 | 000002 | (100.00) | |
| 27/08/03 | 000003 | (2,648.07) | |
| 27/08/03 | 000004 | (747.00) | |
| 28/08/03 | 000005 | (6.84) | |
| 1/09/03 | 000006 | (36.91) | |
| 29/09/03 | 000007 | (41.13) | |
| 26/09/03 | 000008 | (1,439.38) | |
| 25/09/03 | 000009 | (346.63) | |
| 25/09/03 | 000010 | (388.55) | |
| 30/09/03 | 000011 | (698.78) | |
| 2/10/03 | 000012 | (675.00) | |
| 15/10/03 | 000013 | (500.00) | |
| 23/10/03 | 000014 | (2.85) | |
| 23/10/03 | 000015 | (32.96) | |
| 23/10/03 | 000016 | (35.80) | |
| 27/10/03 | 000017 | (1,750.00) | |
| 27/10/03 | 000018 | (35.80) | |
| 29/10/03 | 000019 | (10.23) | |
| 29/10/03 | 000020 | (14.22) | |
| 29/10/03 | 000021 | | |

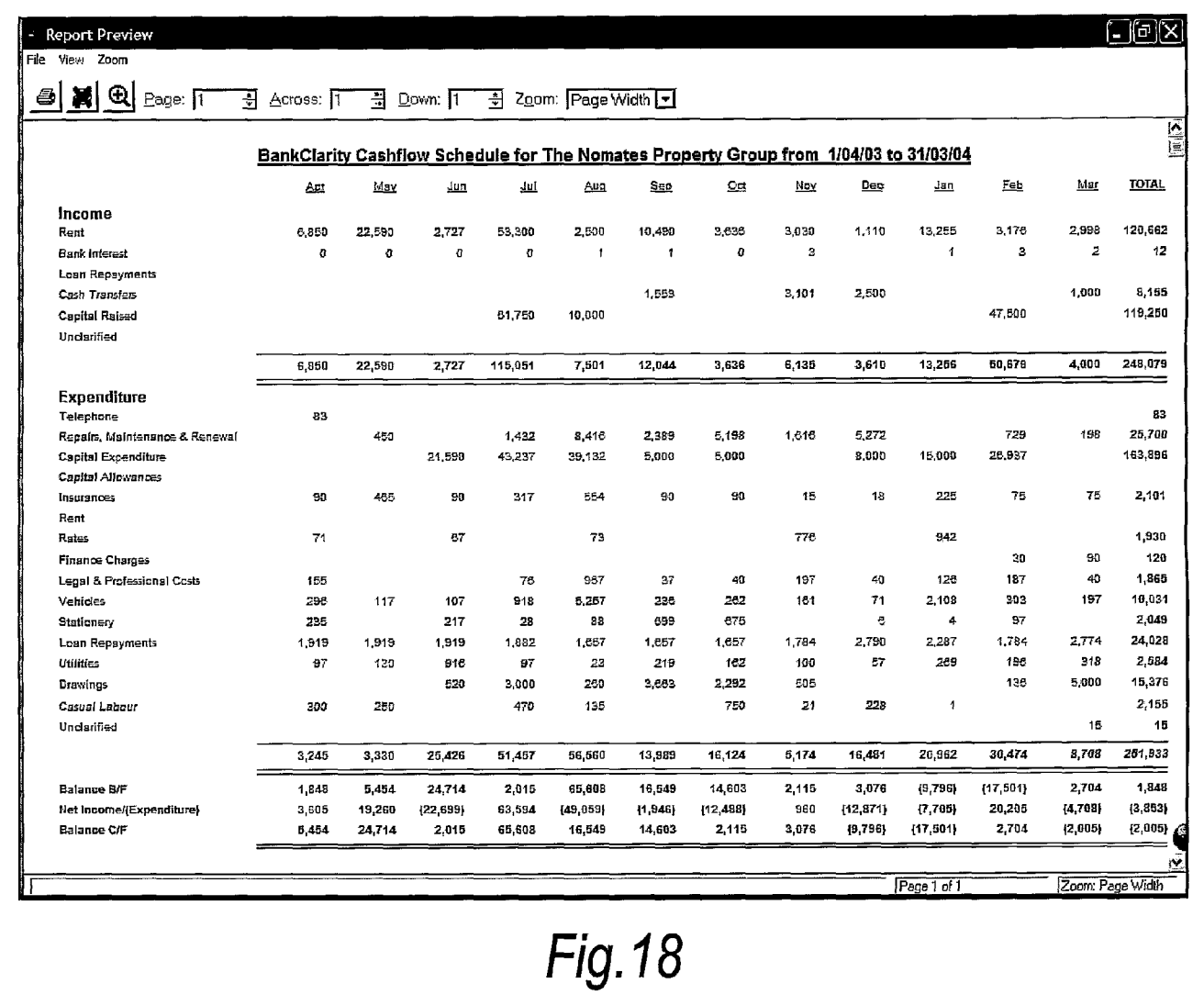

Report Preview

File View Zoom

Page: 1 Across: 1 Down: 1 Zoom: Page Width

BankClarity Cashflow Schedule for The Nomates Property Group from 1/04/03 to 31/03/04

| | Apr | May | Jun | Jul | Aug | Sep | Oct | Nov | Dec | Jan | Feb | Mar | TOTAL |
|---|---|---|---|---|---|---|---|---|---|---|---|---|---|
| **Income** | | | | | | | | | | | | | |
| Rent | 6,850 | 22,590 | 2,727 | 53,300 | 2,500 | 10,490 | 3,636 | 3,030 | 1,110 | 13,255 | 3,176 | 2,998 | 120,662 |
| Bank Interest | 0 | 0 | 0 | 0 | 1 | 1 | 0 | 3 | | 1 | 3 | 2 | 12 |
| Loan Repayments | | | | | | | | | | | | | |
| Cash Transfers | | | | | | 1,553 | | 3,101 | 2,500 | | | 1,000 | 8,155 |
| Capital Raised | | | | 61,750 | 10,000 | | | | | | 47,500 | | 119,250 |
| Unclarified | | | | | | | | | | | | | |
| | 6,850 | 22,590 | 2,727 | 115,051 | 7,501 | 12,044 | 3,636 | 6,135 | 3,610 | 13,256 | 50,676 | 4,000 | 248,079 |
| **Expenditure** | | | | | | | | | | | | | |
| Telephone | 83 | | | | | | | | | | | | 83 |
| Repairs, Maintenance & Renewal | | 450 | | 1,432 | 8,416 | 2,389 | 5,198 | 1,616 | 5,272 | | 729 | 198 | 25,700 |
| Capital Expenditure | | | 21,590 | 43,237 | 39,132 | 5,000 | 5,000 | | 8,000 | 15,000 | 26,937 | | 163,896 |
| Capital Allowances | | | | | | | | | | | | | |
| Insurances | 90 | 465 | 90 | 317 | 554 | 90 | 90 | 15 | 18 | 225 | 75 | 75 | 2,101 |
| Rent | | | | | | | | | | | | | |
| Rates | 71 | | 67 | | 73 | | | 776 | | 942 | | | 1,930 |
| Finance Charges | | | | | | | | | | | 30 | 90 | 120 |
| Legal & Professional Costs | 155 | | | 76 | 957 | 37 | 40 | 197 | 40 | 128 | 187 | 40 | 1,865 |
| Vehicles | 296 | 117 | 107 | 918 | 5,257 | 236 | 262 | 161 | 71 | 2,108 | 303 | 197 | 10,031 |
| Stationery | 225 | | 217 | 28 | 88 | 699 | 675 | | 6 | 4 | 97 | | 2,049 |
| Loan Repayments | 1,919 | 1,919 | 1,919 | 1,882 | 1,657 | 1,657 | 1,657 | 1,784 | 2,790 | 2,287 | 1,784 | 2,774 | 24,028 |
| Utilities | 97 | 120 | 916 | 97 | 23 | 219 | 162 | 100 | 57 | 269 | 196 | 318 | 2,584 |
| Drawings | | | 520 | 3,000 | 260 | 3,683 | 2,292 | 505 | | | 136 | 5,000 | 15,376 |
| Casual Labour | 300 | 250 | | 470 | 135 | | 750 | 21 | 228 | 1 | | | 2,155 |
| Unclarified | | | | | | | | | | | | 15 | 15 |
| | 3,245 | 3,330 | 25,426 | 51,457 | 56,560 | 13,989 | 16,124 | 5,174 | 16,481 | 20,962 | 30,474 | 8,708 | 251,933 |
| Balance B/F | 1,848 | 5,454 | 24,714 | 2,015 | 65,608 | 16,549 | 14,603 | 2,115 | 3,076 | (9,796) | (17,501) | 2,704 | 1,848 |
| Net Income/(Expenditure) | 3,605 | 19,260 | (22,699) | 63,594 | (49,059) | (1,946) | (12,488) | 960 | (12,871) | (7,705) | 20,205 | (4,708) | (3,853) |
| Balance C/F | 5,454 | 24,714 | 2,015 | 65,608 | 16,549 | 14,603 | 2,115 | 3,076 | (9,796) | (17,501) | 2,704 | (2,005) | (2,005) |

Page 1 of 1 Zoom: Page Width

Fig. 18

Forecast Wizard

1. Confirm/enter the Month [March ▼] and Year [2004 ▼] on which to base your forecast [Next ==>]

2. Confirm/enter the number of months on which this forecast is base your [12 ▲▼] [Next ==>]

3. Confirm/enter the Month [March ▼] and Year [2005 ▼] for your forecast [Next ==>]

4. Enter a Title for forecast (recommended) [Example Forecast]

5. Enter a Description for forecast (optional)
[25% increase in Legal & Professional Costs]
[Next ==>]

6. Enter the opening balance (required) [(99)] [Next ==>]

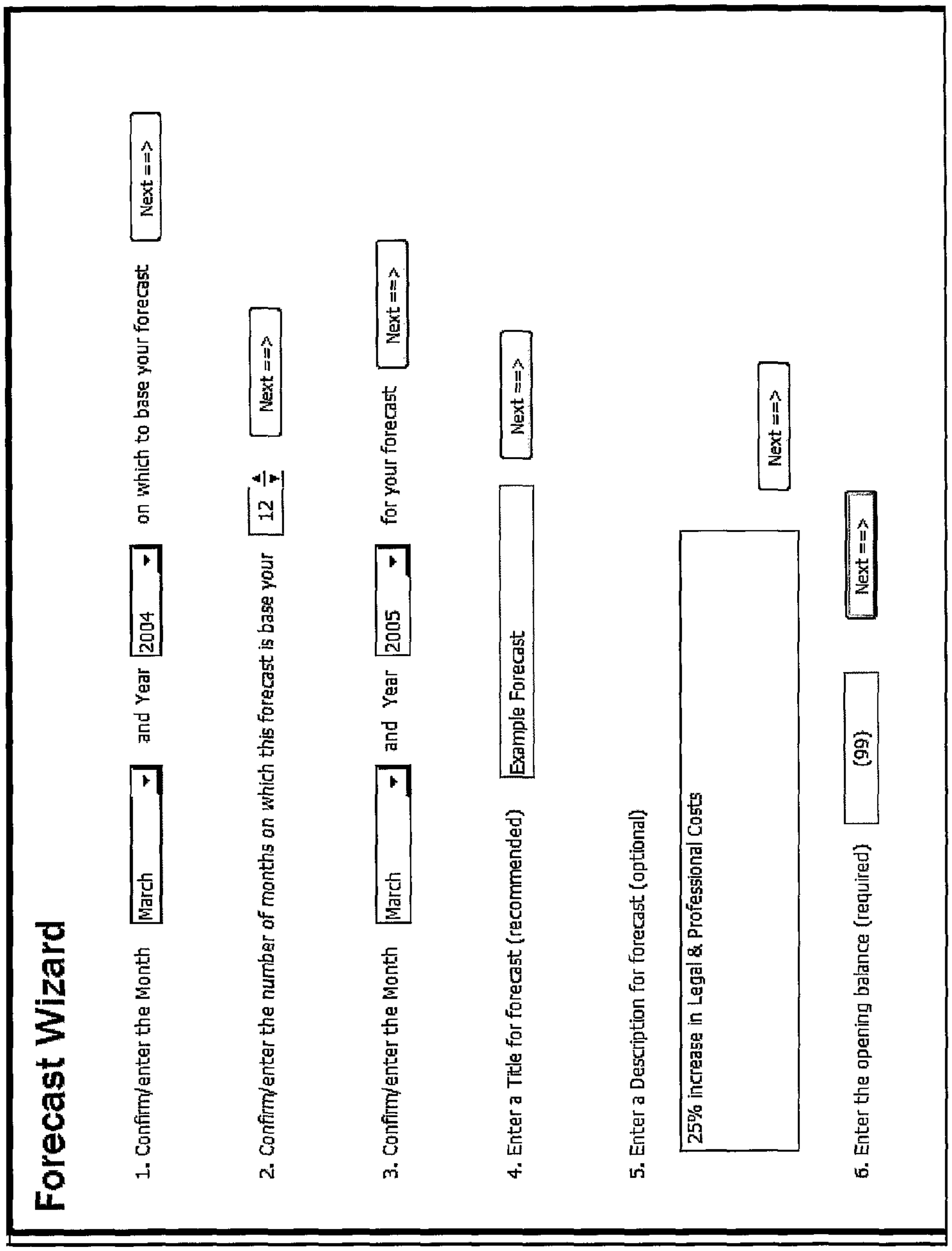

*Fig.19*

Forecast Wizard

7. Enter percentage increases or decreases for each heading

| Heading | Percentage increase/(decrease) |
|---|---|
| Rent | |
| Bank Interest | |
| Loan Repayments | |
| Cash Transfers | |
| Capital Raised | |
| Telephone | |
| Repairs, Maintenance & Renewal | |
| Capital Expenditure | |
| Capital Allowances | |
| Insurances | |
| Rent | |
| Rates | |
| Finance Charges | |
| Legal & Professional Costs | 25 |
| Vehicles | |
| Stationery | |
| Loan Repayments | |
| Periodicals | |
| Utilities | |
| Drawings | |

Next ==>

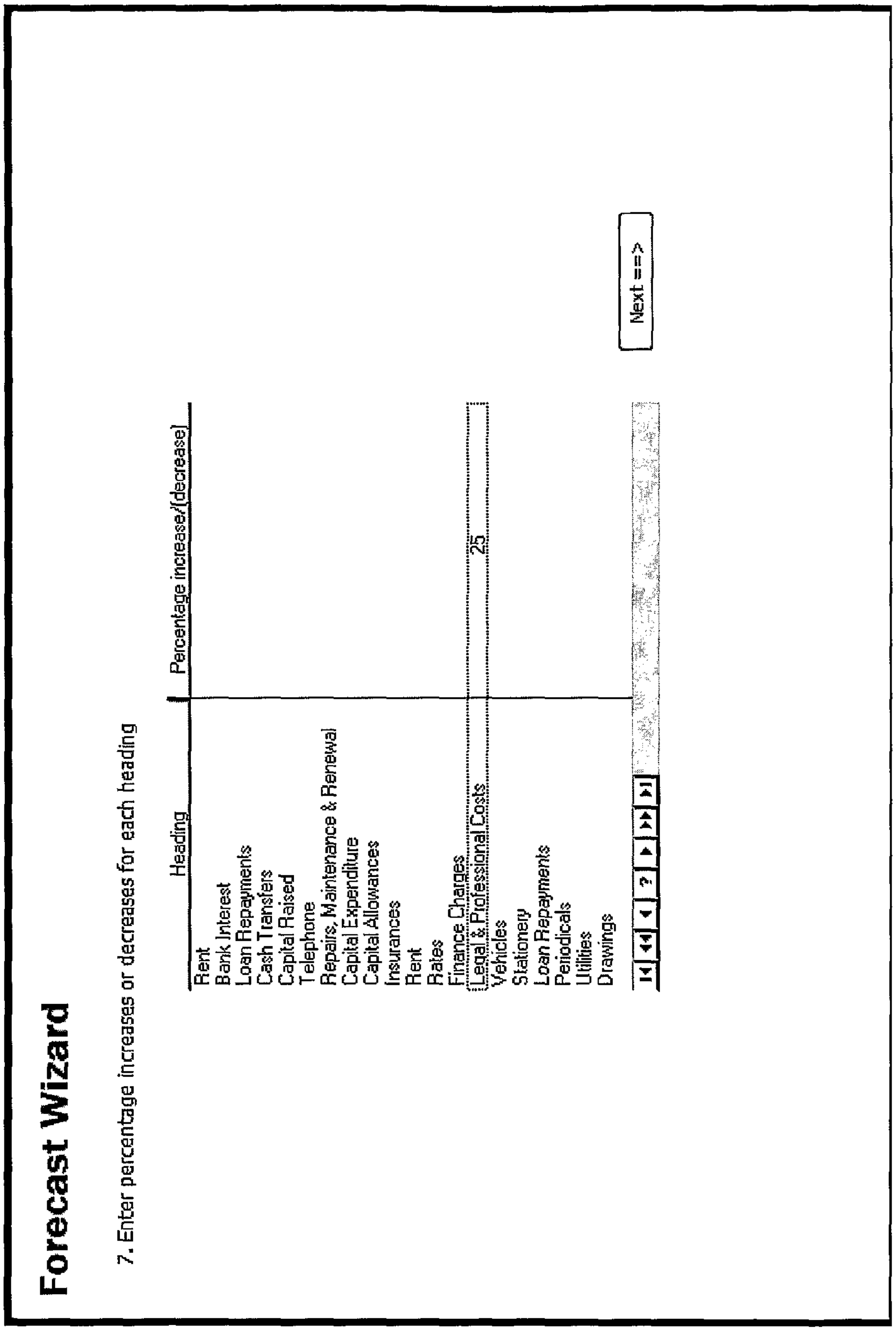

Fig.20

Forecast Wizard

At THIS stage

8. Do you want to amend INDIVIDUAL monthly percentage increases or decreases for each heading?  [Yes]  [No]

9. Do you want to add or subtract INDIVIDUAL monthly amounts for each heading?  [Yes]  [No]

[Finish]

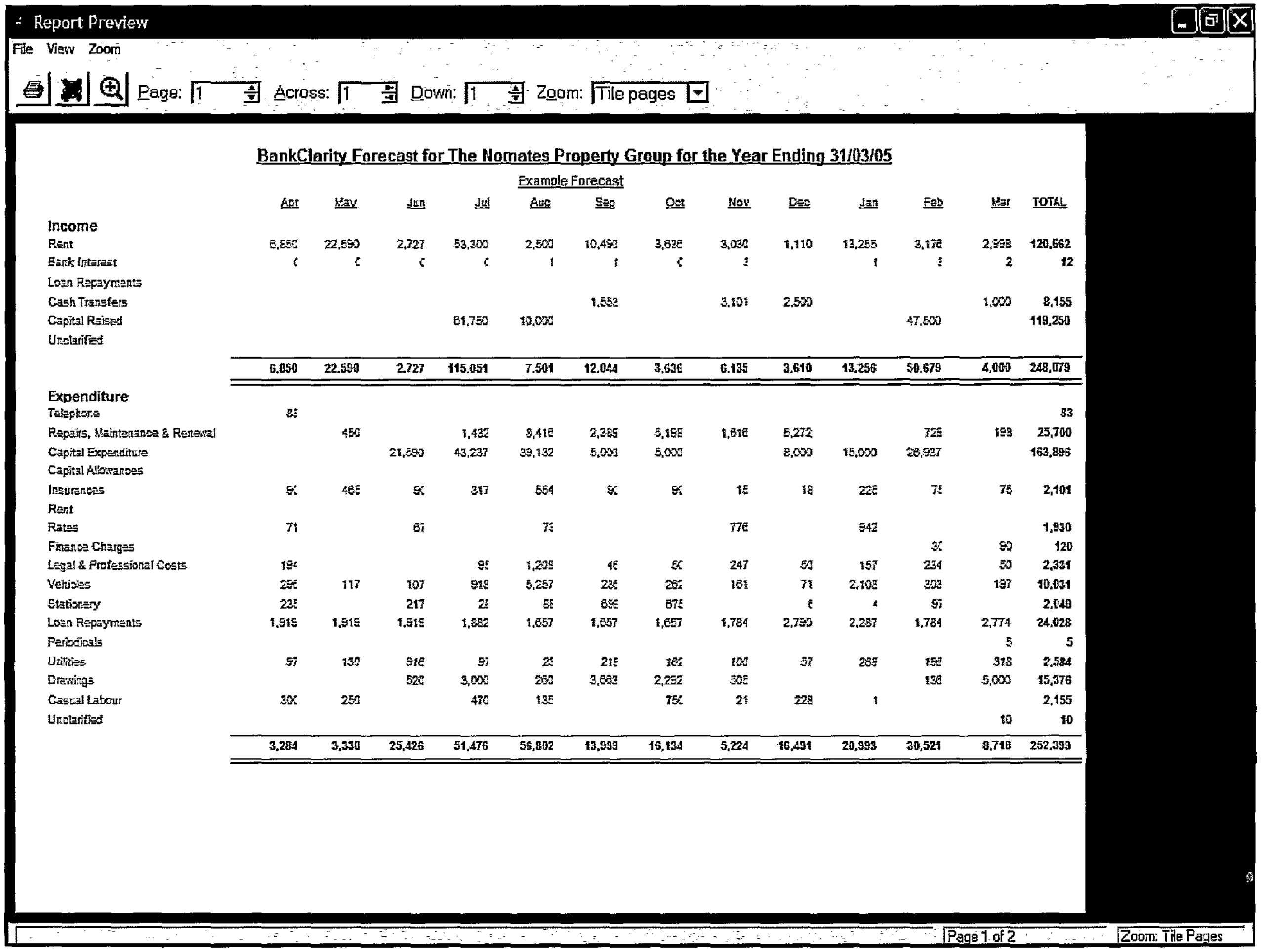

BankClarity Forecast for The Nomates Property Group for the Year Ending 31/03/05

Example Forecast

| | Apr | May | Jun | Jul | Aug | Sep | Oct | Nov | Dec | Jan | Feb | Mar | TOTAL |
|---|---|---|---|---|---|---|---|---|---|---|---|---|---|
| **Income** | | | | | | | | | | | | | |
| Rent | 6,85[illegible] | 22,590 | 2,727 | 53,300 | 2,500 | 10,490 | 3,636 | 3,030 | 1,110 | 13,255 | 3,176 | 2,998 | 120,662 |
| Bank Interest | [illegible] | [illegible] | [illegible] | [illegible] | 1 | 1 | [illegible] | [illegible] | | 1 | [illegible] | 2 | 12 |
| Loan Repayments | | | | | | | | | | | | | |
| Cash Transfers | | | | | | 1,552 | | 3,101 | 2,500 | | | 1,000 | 8,155 |
| Capital Raised | | | | 61,750 | 10,000 | | | | | | 47,500 | | 119,250 |
| Unclarified | | | | | | | | | | | | | |
| | 6,850 | 22,590 | 2,727 | 115,051 | 7,501 | 12,044 | 3,636 | 6,135 | 3,610 | 13,256 | 50,679 | 4,000 | 248,079 |
| **Expenditure** | | | | | | | | | | | | | |
| Telephone | 8[illegible] | | | | | | | | | | | | 83 |
| Repairs, Maintenance & Renewal | | 450 | | 1,432 | 8,416 | 2,385 | 5,198 | 1,616 | 5,272 | | 725 | 198 | 25,700 |
| Capital Expenditure | | | 21,590 | 43,237 | 39,132 | 5,000 | 5,000 | | 8,000 | 15,000 | 26,937 | | 163,896 |
| Capital Allowances | | | | | | | | | | | | | |
| Insurances | 9[illegible] | 465 | 9[illegible] | 317 | 564 | 9[illegible] | 9[illegible] | 15 | 18 | 225 | 7[illegible] | 76 | 2,101 |
| Rent | | | | | | | | | | | | | |
| Rates | 71 | | 67 | | 7[illegible] | | | 776 | | 942 | | | 1,930 |
| Finance Charges | | | | | | | | | | | 3[illegible] | 90 | 120 |
| Legal & Professional Costs | 19[illegible] | | | 9[illegible] | 1,209 | 4[illegible] | 5[illegible] | 247 | 50 | 157 | 234 | 50 | 2,331 |
| Vehicles | 25[illegible] | 117 | 107 | 918 | 5,257 | 23[illegible] | 26[illegible] | 161 | 71 | 2,105 | 302 | 197 | 10,031 |
| Stationery | 23[illegible] | | 217 | 2[illegible] | 5[illegible] | 69[illegible] | 67[illegible] | | [illegible] | [illegible] | 97 | | 2,049 |
| Loan Repayments | 1,919 | 1,919 | 1,919 | 1,882 | 1,657 | 1,657 | 1,657 | 1,784 | 2,790 | 2,287 | 1,784 | 2,774 | 24,028 |
| Periodicals | | | | | | | | | | | | 5 | 5 |
| Utilities | 97 | 130 | 916 | 97 | 2[illegible] | 21[illegible] | 16[illegible] | 100 | 57 | 285 | 156 | 318 | 2,584 |
| Drawings | | | 520 | 3,000 | 260 | 3,563 | 2,292 | 505 | | | 136 | 5,000 | 15,376 |
| Casual Labour | 30[illegible] | 250 | | 470 | 135 | | 75[illegible] | 21 | 228 | 1 | | | 2,155 |
| Unclarified | | | | | | | | | | | | 10 | 10 |
| | 3,284 | 3,330 | 25,426 | 51,476 | 56,802 | 13,593 | 16,134 | 5,224 | 16,491 | 20,993 | 30,521 | 8,718 | 252,393 |

METHOD AND APPARATUS FOR ORGANISING FINANCIAL DATA

The invention relates to methods and systems for organising financial data, such as on-line banking information and the like and to methods and systems for generating management information.

On-line banking enables individuals and businesses to access bank accounts online, for example via the Internet. Typically, online banking enables an individual or business to view bank statements, make pre-defined bill payments, initiate bank transfers and download statement information. In addition to Internet banking, there are provided schemes for dialing directly (for example via a modem) into a financial institution's computer system to access entries relating to one or more bank accounts.

Management information is the term given to data, particularly financial data, used to evaluate an organisation's performance. Management information may include past, present and predictive information.

In addition to the increased use and acceptance of on-line banking, the use of computer-based accounting packages is becoming increasingly attractive to small business users and individuals, in addition to larger organisations that have typically used computer-based accounting packages for some time.

The vast majority of businesses do not have a financial accounting system but still have the requirement to produce accounting records (to assess their profitability and asset position). Traditionally, the first step in generating these accounting records is the coding of bank statements by the user's accountant, whereby each entry from the paper-based bank statement is manually entered into the accountant's computer system. This is a lengthy, error-prone process and wholly reliant on the accuracy of the data input. Problems associated with the coding of bank statements are known and are at least partially addressed by some existing software packages.

Individuals and small business are able to use increasingly sophisticated computer-based accounting packages to make records of their financial affairs. For example, a business can make detailed electronic records of all of their transactions and use this data to analyse the past performance of the business and to make predictions of future performance.

There are two key requirements of existing computer-based accounting packages. First, the need to input data relating to every transaction, whether cash based or not, regardless of the timing of the associated cash transaction. Second, the need to balance the records kept by an individual or a business with the records kept at the relevant financial institution(s). The increasing use of on-line banking facilities, in particular the ability to download statements, has made it possible for a user to directly compare their own financial records with the financial records stored at the relevant financial institutions.

A number of standards for the transfer of data relating to financial transactions have been developed, such as Quicken interchange format (QIF) and Open Financial Exchange (OFX). Such standards provide specifications for the electronic exchange of data between financial institutions, businesses and consumers via the Internet. The development of these standards has aided the development of proprietary accounting software packages by enabling the developers of those packages to be sure that their software will be able to communicate with a majority of financial institutions.

Thus, software packages exist that enable an operator to enter detailed accounting information relating to transactions that are anticipated to pass through their bank account and then to download a statement from their bank and to electronically compare the data they have entered with the actual transactions recorded at their bank.

One method of comparing the downloaded data with user-entered data is through a reconciliation process. During reconciliation, a software package will typically try to match the transactions in the downloaded statement with the transactions entered by the user. The user is then required to select and review each unmatched transaction, for example by matching the transaction to one of a predefined list of possible transactions. The user may also be required to review each matched transaction to ensure that the matching has been done correctly.

Software packages of the sort described above enable individuals and businesses to track current accounts, savings, loans, investments, assets and the like and to generate accurate registers of these financial details. Once generated, these registers can be used for analysis of historical data and for forecasting future financial positions.

Thus, software packages of the sort described above represent a significant advance over previous computer-based accounting systems in which the computer-based data needed to be checked against paper-based bank account data.

Despite the significant advantages of the accounting packages described above, there are a number of problems associated with existing financial packages.

A significant investment of time is required in setting up account registers and a further ongoing investment of time is required in order to continually populate those registers with data. Furthermore, a significant ongoing time investment is required to reconcile each downloaded statement with the data entered by the user.

Another problem with existing financial software packages is that they tend to be relatively complicated to use. Setting up account registers is a difficult, specialised task and may require an expert to assist in developing the register. Furthermore, entering data is also a relatively skilled task. Data that is not entered accurately and methodically will lead to a significant increase in the time required to reconcile the bank account data with the data entered in the accounting package. Thus an investment in the training of users of such systems is essential to make best use of such systems.

Many existing systems are, in the large part, only capable of producing accounting records some time after the financial year end of the accountant's client; this is particularly true for software packages used by accountants for clients without computer based accounting systems. Clearly, useful accounting and management information should be as up-to-date as possible. Even in systems which enable data to be kept up-to-date, this requires a large amount of data to be entered by a skilled workforce. This may not be possible for individuals and small businesses.

Even with the computer-based accounting systems currently available, accountants usually require the production of their client's paper bank statements when producing accounting records.

A problem associated with a number of computer-based accounting packages is the duplication of entries caused when one or more user imports data into a software package more than once.

A further problem with known accounting packages is the need to incorporate cheque transactions into the system. Typically, very little information relating to a cheque transaction is provided by a bank statement. Accordingly, information relating to cheque transactions typically needs to be added by an operator on each occasion.

The present invention seeks to address at least some of the problems identified above. It is particularly beneficial to both visually impaired and physically impaired people. The program is able to produce all aspects in large font/print thereby assisting people who are visually impaired. Physically impaired people are also benefited as this system, as outlined later, requires substantially less keying by the user.

The present invention provides a method of organising financial data, the method comprising the steps of:

obtaining electronic data from one or more data sources, said electronic data representing first financial data;

importing said electronic data into a computer program; and using said computer program to automatically create second financial data based on said first financial data, the second financial data being suitable for presentation to a user, wherein at least some of said electronic data is obtained without being manually entered by an operator.

The present invention also provides an apparatus comprising:

means for importing electronic data from one or more data sources, said electronic data representing first financial data; and means for automatically creating second financial based on said first financial data, the second financial data being suitable for presentation to a user, wherein at least some of said electronic data is obtained without being manually entered by an operator.

The present invention further provides a computer program product comprising:

means for importing electronic data from one or more data sources, said electronic data representing first financial data; and means for automatically creating second financial based on said first financial data, the second financial data being suitable for presentation to a user, wherein at least some of said electronic data is obtained without being manually entered by an operator.

By obtaining at least some of the electronic data from an external data source, such as directly from a financial institution, so that data need not be entered by an operator, the twin problems of keeping the data up-to-date and keeping the time and resources required to enter the data to a manageable level are addressed. The raw data obtained in this manner will be up-to-date (at least at the time at which it is downloaded): it follows that management information derived from that data will also be up-to-date. In addition, there is no requirement for an operator to manually enter data relating to financial transactions that are anticipated to pass through a bank account. Thus, all that is required for the data to be kept sufficiently up-to-date is to regularly import data. This step can be automated, thereby further reducing the effort required from an operator.

A number of other problems are also addressed by the method of the present invention. Using data obtained directly from a financial institution significantly reduces the likelihood of errors being included in the data. Data can be obtained from a number of sources. Thus, accounts information can be generated, for example, from a combination of bank accounts, credit card accounts and savings accounts. It is noted also that the requirement for reconciling data entered by an operator with data obtained from an online bank statement is not required if no data is entered by an operator. Furthermore, it is noted that the system can become almost completely automated within a few weeks of using the present invention; this is particularly true when quantity of cheques used is low.

Thus, the method of the present invention enables up-to-date management information to be generated with very little operator effort or expertise. This contrasts greatly with prior art systems, examples of which include the out-of-date, error prone and expensive accounting records produced from paper records and the previous computer-based systems that require significant workloads from skilled operators in order to generate accounting records that are often less up-to-date, less accurate and certainly more expensive to produce than the accounting records generated in accordance with the present invention.

At least some of said electronic data may be downloaded via a communications link, such as a wireless communications link.

In one form of the invention, at least some of said first financial data is stored at one or more financial institutions, such as a bank.

The importing step described above may be carried out automatically, without requiring operator intervention. Clearly, eliminating operator intervention from this step reduces the time and expertise required from a user and reduces yet further the likelihood of introducing errors. Automatic importing also enables the data to be kept up-to-date, without requiring operator assistance and also enables this step to be carried out at times when network demand is low, for example overnight.

At least some of said first financial data may be related to a bank account. At least some of said first data may be related to a credit card account.

The electronic data may include data obtained by cheque imaging, for example by reading one or more markings made on said cheque using a scanner and/or by making use of optical character recognition technology. Incorporating cheques into an automated or semi-automated system offers clear advantages over many prior art systems in which cheque data entry must be performed manually by an operator.

The present invention may allow a list of cheque transactions to be generated and/or may allow a list of unclarified cheque transactions to be generated.

The present invention may also include the steps of specifying one or more data headings and allocating at least some of said second financial data to one or more of said headings. Further, second financial data having the same format as previously allocated second financial data may be automatically allocated to the same heading as said previously allocated second financial data. In some forms of the invention, the first financial data may be received in a format in which the data has already been allocated to one or more data headings, i.e. in a pre-clarified format. This pre-clarification may be carried out at the source of the data (e.g. a financial institution) or by a third party. Such pre-clarification has the advantage of further automating the organisation of the financial data.

The present invention may also include the step of specifying a set of contacts for each heading, the method further comprising the step of allocating at least some of said second financial data to one or more of said contacts. Further, data having the same format as previously allocated second financial data may be automatically allocated to the same contact as the previously allocated second financial data. In some forms of the invention, the first financial data may be received in a format in which the data has already been allocated to one or more contacts, i.e. in a pre-clarified format. This pre-clarification may be carried out at the source of the data (e.g.

a financial institution) or by a third party. Such pre-clarification has the advantage of further automating the organisation of the financial data.

It should be noted that the allocation of financial data to one or more headings and/or contacts as described above is sometimes referred to as the clarification of that data. It is hereby stated that references herein to the "allocation", "clarification" and "posting" of data refer to the allocation process described above. Those terms are therefore interchangeable.

The present invention may allow historical analysis to be performed on said second financial data. For example, the historical analysis may provide a month-on-month analysis of all income and expenditure with opening and closing balances calculated. Additional or alternative features of the historical analysis may include providing a schedule of entries for each heading, providing a breakdown of all entries where VAT is paid and where VAT is payable and calculating a VAT return for a period specified by a user. Such historical analysis often represents a key component of Management Information.

The present invention may allow future analysis to be performed on said second financial data. For example, a user may specify a past period indicating the data to be used to generate said future analysis and a future period for which said future analysis is to be generated. The user may specify an expected percentage difference in the income or expenditure for said'future period compared with said past period. Alternatively, or in addition, for one or more of said headings, the user may specify an expected percentage difference in the income or expenditure for separate sub-periods of said future period compared with corresponding sub-periods of said past period.

The present invention may allow an operator to set an operational date of a transaction that is different to the date recorded at the bank. For example, when a payment is made by cheque, that cheque may be given an operational date that is the date on which the cheque is written that is different to the date that is given to the payment by the bank. In one form of the invention, the operator is able to indicate whether historical and/or future analysis should be carried out using bank dates or operational dates.

Alternatively, or in addition, for one or more of said headings, the user may specify an expected absolute difference in the income or expenditure for separate sub-periods of said future period compared with corresponding sub-periods of said past period. Alternatively, or in addition, for one or more of said headings, the user may specify an absolute expected value for the income or expenditure for one or more sub-periods of said future period compared with corresponding sub-period(s) of said past period. Such predictive analysis can be a powerful Management Information tool and the present invention can be used to generate this information quickly and simply.

Each of the contacts mentioned above may be an income contact, an expenditure contact or a no invoice contact. An invoice received from an expenditure contact should be posted to a Purchase Ledger and an invoice raised against an income contact should be posted to a Sales Ledger.

In one form of the invention, in response to an attempt to raise an invoice against an expenditure contact, an income contact is generated having the same details as said expenditure contact and the said invoice is raised against that income contact, provided that such an income contact does not already exist. In one form of the invention, in response to an attempt to receive an invoice against an income contact, an expenditure contact is generated having the same details as said income contact and the said invoice is received against that expenditure contact, provided that such an expenditure contact does not already exist. An income contact may be provided with a suffix "I" and an expenditure contact may be provided with a suffix "E". In one form of the invention, these suffixes are only used where both income and expenditure versions of the same contact exist.

In one form of the invention, if an operator selects an income contact, he is prevented from receiving an invoice against that contact. In one form of the invention, if an operator selects an expenditure contact, he is prevented from raising an invoice against that contact.

The said first financial data may include data relating to a plurality of accounts. Each account may relate to a different client, for example different customers of a Trust Fund.

The said first financial data may comprise a plurality of transactions, each transaction relating to a single account, the method further comprising the steps of, for each transaction, identifying the account to which the transaction belongs and allocating that transaction to the identified account. In the case that an account cannot be identified, a note may be made in an error log.

The said first financial data may include a closing balance for each of said accounts. In one form of the invention, for each account, the closing balance indicated by said first financial data is checked against a closing balance calculated after said transactions are applied to each account. Any discrepancies may be logged in an error file.

The said electronic data may be stored in the program's proprietary data format (such as Quicken interchange format or open financial exchange) or exported to any industry standard format such as a spreadsheet, eg Microsoft's Excel or a csv file (Comma Separated Value).

The present invention also provides a method of providing a workflow overview, the method comprising the steps of:

for each of a plurality of accounts determining whether data has been downloaded within a management-set download time limit;

for each of said accounts, determining whether downloaded data has been allocated within a management-set allocation time limit; and presenting data to an operator in a visual form relating to the number of accounts that meet the download time limit and the allocation time limit.

The step of determining whether data has been downloaded within a download time limit may comprise the steps of specifying an account as being on track if a download deadline has not passed, behind track if a first deadline has passed but a second deadline has not passed, and overdue if both the first and second deadlines have passed.

The step of determining whether downloaded data has been allocated within an allocation time limit may comprise the steps of specifying an account as being on track if an allocation deadline has not passed, behind track if a first deadline has passed but a second deadline has not passed, and overdue if both the first and second deadlines have passed.

In one form of the invention, the management-set download time limit is a download date plus a management-set download leeway period.

The step of determining whether data has been downloaded within a download time limit may comprise the steps of:

specifying an account as being on track if the management-set download time limit has not expired;

specifying an account as being behind track if the data has not been downloaded, the management-set download time limit has expired but the management-set download time limit plus a management-set allocation leeway period has not expired; and specifying an account as being overdue if data has not been downloaded and the management-set download time limit plus the management-set allocation leeway period has expired.

In one form of the invention, the management-set allocation time limit is a download date plus a management download leeway period plus a management-set allocation leeway period.

In one form of the invention, the step of determining whether downloaded data has been allocated within a management-set allocation time limit comprises the steps of:

specifying an account as being on track if the account includes no unallocated data;

specifying an account as being on track if the account includes unallocated data but the management-set allocation time limit has not expired;

specifying an account as being behind track if the account includes unallocated data, the management-set allocation time limit has expired but the management-set allocation time limit plus the allocation leeway has not expired; and specifying an account as being overdue if the account includes unallocated data and the management-set allocation time limit plus the allocation leeway period has expired.

The step of presenting data may include a visual display of the number of accounts that are on track, the number of accounts that are behind track and the number of accounts that are overdue.

The invention may include, for each of said accounts, determining whether there are any unclarified entries in the previous 12 months. The visual display may include a bar chart visually representing the number of clients for which there are no unclarified entries in that period.

The invention may include, for each of said accounts, determining whether no entries have been made in the previous 12 months. The visual display may include a bar chart visually representing the number of clients for which there has been no activity in that period.

The said plurality of accounts may include one or more bank accounts.

The said data may be financial data.

The said data may be allocated when said data has been allocated to one or more data headings. The said data may be allocated to one or more contacts.

The said visual display may comprise a bar chart.

The method of providing a workflow overview may also include means for providing automated reminders of actions that are required. For example, an operator may receive a diary reminder of downloads that are due, behind track and/or overdue. An operator may receive a diary reminder of clarifications that are due, behind track and/or overdue.

A method and apparatus in accordance with the invention will now be described, by way of example only, with reference to the accompanying schematic drawings in which:

FIG. 14 is a screenshot showing a further part of the data clarification process of FIGS. 12 and 13;

FIG. 18 is a screenshot showing an exemplary cashflow schedule generated by the historical analysis process of FIGS. 16 and 17;

FIG. 19 is a screenshot showing a first part of an exemplary forecast wizard;

FIG. 20 is a screenshot showing a second part of the exemplary forecast wizard of FIG. 19;

FIG. 22 is a screenshot of an exemplary forecast generated using the exemplary forecast wizard of FIGS. 19 to 22;

Although for demonstration purposes the screen shots show a "program", the system is also deliverable via a web browser (eg Microsoft's Internet Explorer), which is now a common "front end". The functionality of the program is unchanged.

The software package of the present invention is able to receive financial data from a number of sources and use that data to perform analysis on that data, as described below.

Figure 1:
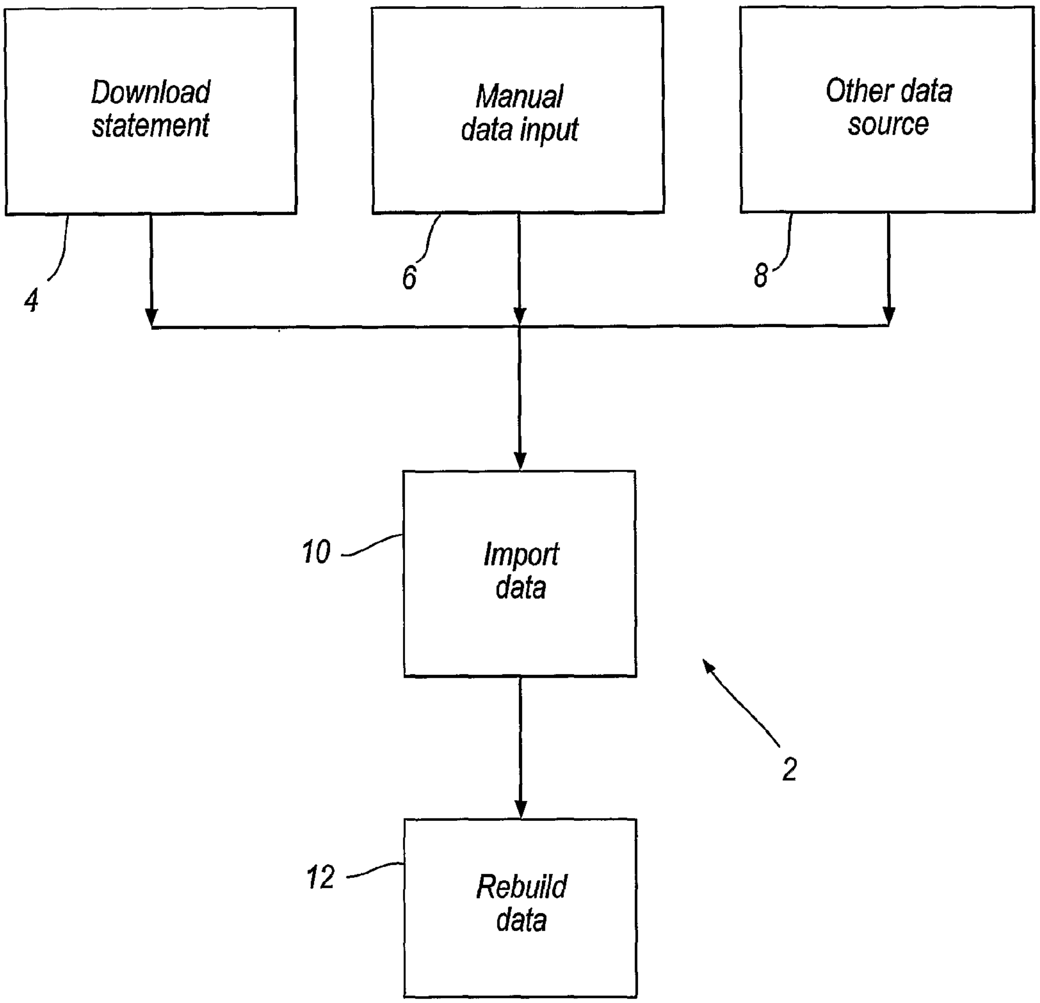
FIG. 1 is a block diagram providing an overview of a system in accordance with the present invention.

FIG. 1 is block diagram, indicated generally by the reference numeral 2, demonstrating how data is imported into the software package. There are a number of possible sources of data for the software package. The data sources shown in the block diagram 2 are a downloaded statement 4, manual data input 6, and other data sources 8.

Downloaded statements 4 may be derived from a number of sources, including online bank accounts and online credit card accounts. The statement may be downloaded direct from the financial institution's computer system to a user's computer via the Internet, via a dial-up connection or via another communications system. Alternatively, the statement may be downloaded to an independent server from where it is further downloaded to the financial software package. In a similar manner, manual data input may be provided direct to the user's computer or into an independent server from where it is subsequently downloaded to the financial software package.

Other sources of data 8 may be used to provide data input for the system. The other data sources might include, for example, an automatic cheque reading apparatus, which recognises a symbol on a cheque which in turn records that on the bank statements or the bank's computer or utilising Optical Character Recognition (OCR) to "read" the payee of a cheque and provide that information to the customer.

Schemes for cheque imaging are known in the art and it would be within the competence of the person skilled in the art to make use of those technologies to provide a cheque reading apparatus suitable for importing data in the step 10 of FIG. 1 described above.

Whatever the source of the data, that data is imported into the financial software package at step 10. Once that data is imported, the original data is rebuilt by the software package at step 12 so that it can be presented to the user. It should be noted that whilst the rebuilt data resembles the user's original bank statement the system provides additional features, such as the easily recognisable difference between debit and credit entries and balances.

A number of screenshots are described below. The screenshots relate to an exemplary financial software product in accordance with the present invention. It is to be understood that the software product is just one example of a product in accordance with the present invention. Other products are within the scope of the present invention.

In order to illustrate the functionality of the exemplary software product, that product will be illustrated with reference to exemplary data relating to a fictional company called "The Nomates Property Group". The Nomates Property Group has a current account (Account Number 123456) with Lloyds TSB Bank and two savings accounts (Account Numbers, 6974 and 9399). The savings accounts in this example have nil balances as they have been closed, but historical data is still needed for a full picture of the financial position of the Nomates Property Group to be obtained.

For the purpose of this example, the exemplary current account was opened on 28 Jul. 2003 when the sum of £61, 750.00 was transferred into that account. Since then, a number of transactions have occurred, including a number of cash transfers out of the account and a number of bill payments. The Nomates Property Group leases property and the main income source of the company is in the form of rent, for example from Swansea City Council.

Figure 2:
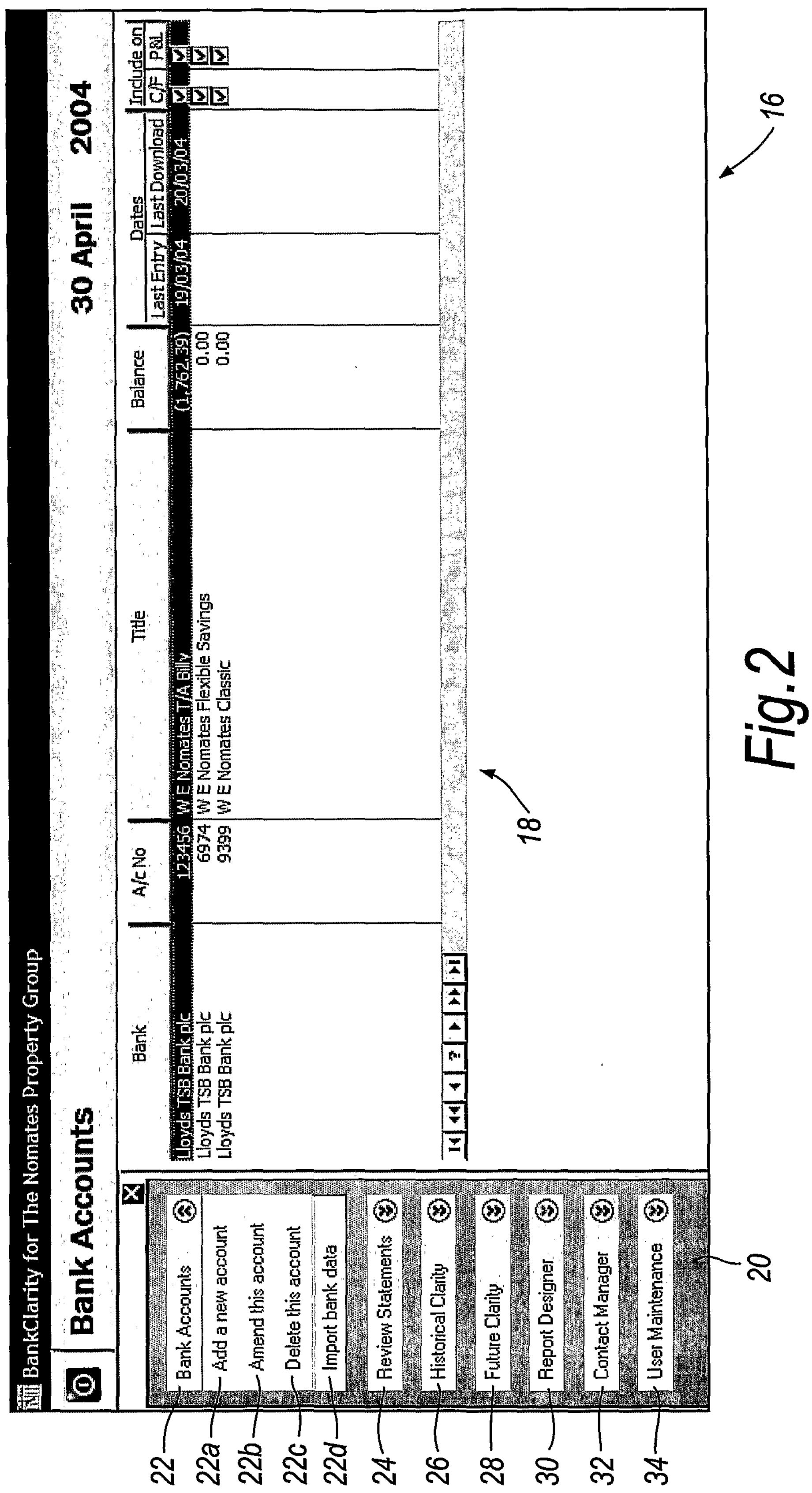
FIG. 2 is a screenshot showing a first stage of an exemplary statement download process.
Figure 3:
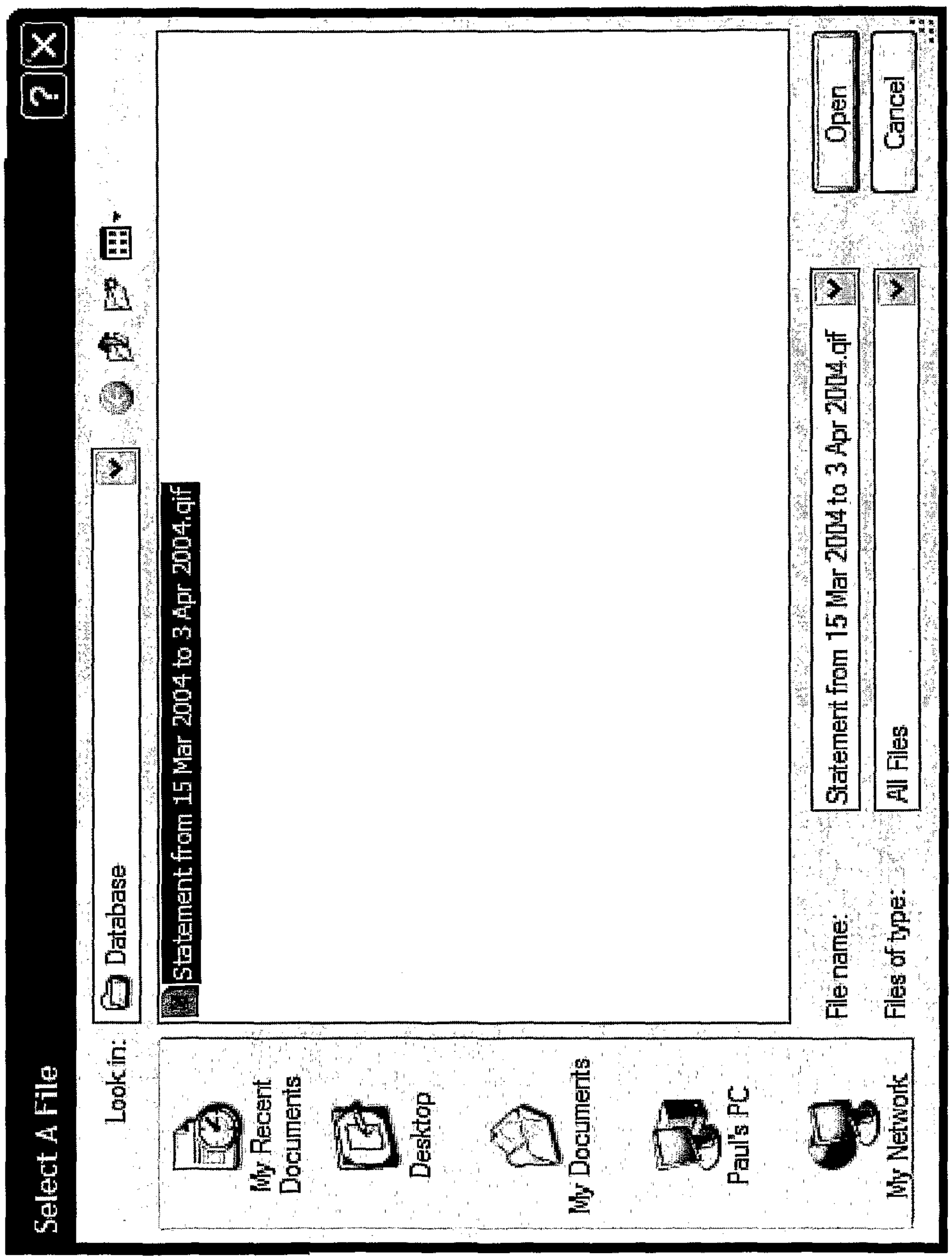
FIG. 3 is a screenshot showing a second stage of an exemplary statement download process.

FIGS. 2 and 3 are screenshots showing an exemplary download process for an exemplary software package used in accordance with the present invention.

FIG. 2 shows a graphical user interface (GUI) 16 of a financial software package in accordance with the present invention. The GUI 16 has an area 18 providing information to an operator (in the example of FIG. 2, a list of bank accounts with which the window is associated is displayed). One of those bank accounts (Account number 123456 with Lloyds TSB Bank plc) is highlighted. The graphical user interface 16 has a menu portion 20 having a number of menu options available to the user. The menu options shown are bank accounts 22, review statements 24, historical clarity 26, future clarity 28, report designer 30, contact manager 32 and user maintenance 34. Each of those menu options when selected lists a number of further menu options. The various menu options are described in detail below.

In the screenshot of FIG. 2, the bank account option 22 has been selected. As a result, the list of bank accounts associated with the Nomates Property Group is shown. The bank account option 22 has a number of further options: "add a new account" 22*a*, "amend this account" 22*b*, "delete this account" 22*c* and "import bank data" 22*d*. Selecting any of the options 22*a*, 22*b*, 22*c* and 22*d* leads to the relevant function being performed on the highlighted bank account (account number 123456).

For each bank account displayed in the area 18, the name of the bank, the account number, the account name, the balance, the date of the last data entry, the data of the last statement download and tick boxes indicating whether the account should be included in the cash flow analysis and the profit and loss analysis are shown. In the example of FIG. 2, a statement for the highlighted account (account number 123456) was last downloaded on 20 Mar. 2004. A statement covering the period since 20 Mar. 2004 can now be downloaded to update that account, thereby implementing the import data step 10 described above.

The import data step is activated by selecting the menu option "import bank data" 22*d*. As shown in FIG. 3, selecting this option opens a file select window to enable the user to search for a previously downloaded statement that was saved to the user's computer hard drive. In the example of FIG. 3, a bank statement covering the period 15 Mar. 2004 to 3 Apr. 2004 has previously been downloaded and can now be imported into the software package by clicking on the "open" button.

It should be noted that the start date of the statement (15 Mar. 2004) is before the date of the most recent update of that account (20 Mar. 2004). The software of the present invention checks for duplicate entries before importing the data into an account, thus there is no need for the user to ensure that overlaps such as in the present example do not occur.

In an alternative form of the invention, bank statements can be downloaded directly from a bank's website. This could be achieved by opening the statement directly into the program. Furthermore, by recording the Internet bank's security passwords with the program, the program can automatically connect to the bank over the Internet, collect the information required and import that data into the program, with little or no user input. The program could be programmed to obtain this information at set times, e.g. once per day, once per week or once per month. This would also give access to a third party, for example the user's Accountant, with the user having to compromise security by allowing direct access to the user's internet banking account.

A number of means for obtaining statements from financial institutions in order to carry out the step 4 described above are known to persons skilled in the art. Accordingly, it is not required for a full understanding of the present invention to describe how the statement file is obtained from the financial institution.

In addition to the "import bank data" option 24*d*, the options "add a new account" 22*a*, "amend this account" 22*b* and "delete this account" 22*c* are available to the operator of the system. These options enable the operator to add a new account, such as a credit card account, to the system, to amend the details of the highlighted account and to delete the highlighted account respectively. It is within the competence of the skilled person to implement these features and so they will not be discussed in detail herein.

FIGS. 4 to 24 below are screenshots demonstrating a number of features of the present invention, including how a user is able to review and clarify the data downloaded in the import data step 10 described above.

In order to review the data imported into the software package, the user first selects the "review statements" menu option 24. A list of sub-menu options is displayed, they are: "add a new entry" 24*a*, "amend entry" 24*b*, "delete entry" 24*c*, "clarify entry" 24*d*, "print bank statement" 24*e*, "select A/C for review" 24*f*, "search for entry" 24*g*, "Unclarify entries" 24*h* and "Unclarify always" 24*j*.

The menu options "add a new entry" 24*a*, "amend entry" 24*b*, "delete entry" 24*c* can be used to add, amend and delete statement entries respectively and the "print bank statement" 24*e* menu option can be used to print the statement in a variety of ways. In addition, a number of options for searching for particular transactions can be accessed by selecting the "search for entry" option 24*g*; such search options can readily be implemented by the skilled person and are not discussed further here.

Figure 4:
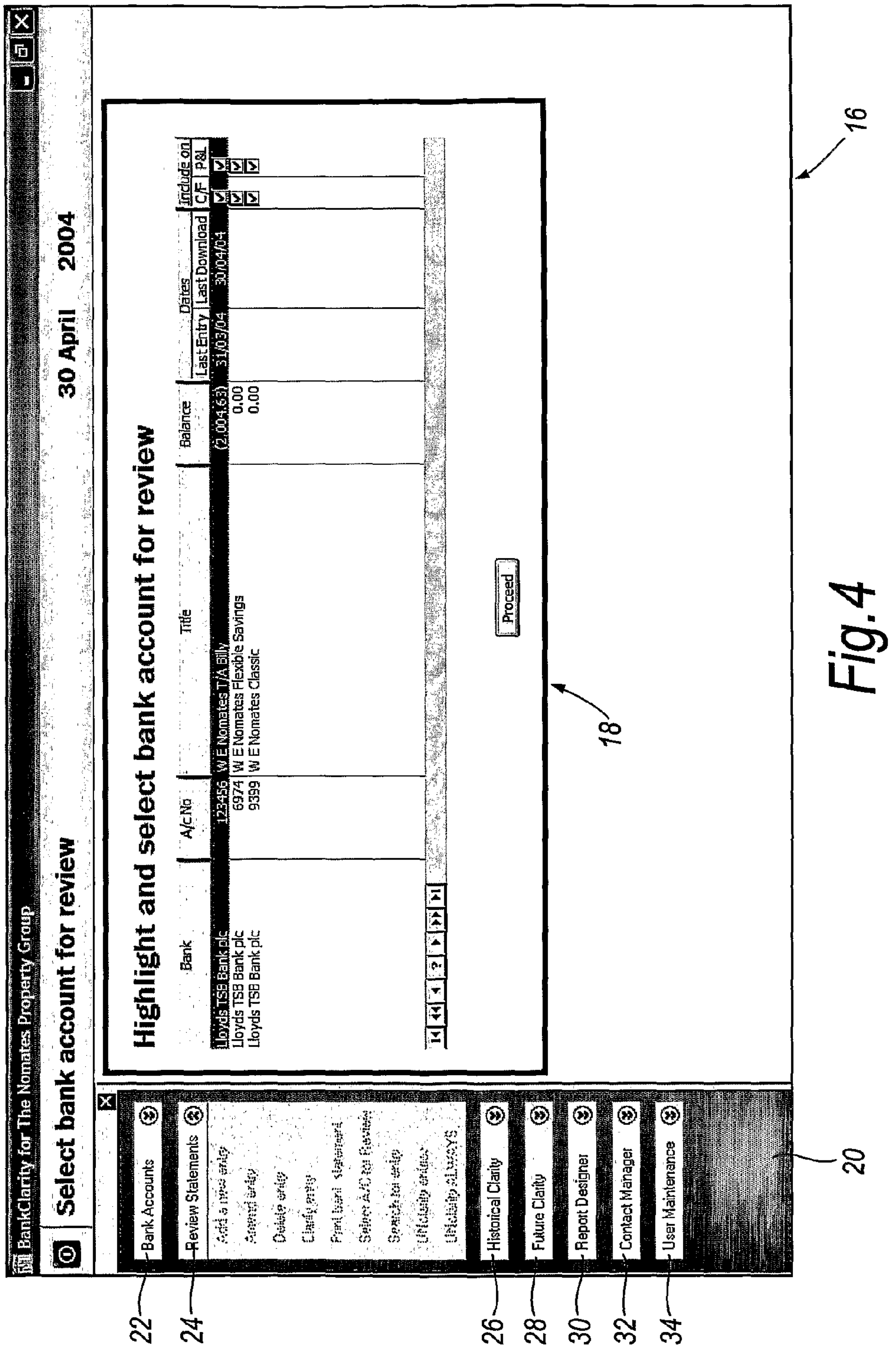
FIG. 4 is a screenshot showing a first stage of an exemplary data clarification process.

Clicking on the "select A/C for review" option 24*f* enables the user to select an account to review. As shown in FIG. 4, the list of accounts is provided in the area 18 of the GUI 16. The user simply highlights one of those accounts and presses the "Proceed" button. The details for that account are then accessed, as shown in FIG. 5.

FIG. 5 again shows the graphical user interface 16 of the software package. Again, the menu portion 20 is shown on the left hand side, with the "Review Statements" option 24 being selected.

The area 18 shows the statement of the selected bank account (account number 123456). All entries in the statement are display (including, but not limited to, the entries most recently downloaded as described above). The statement is displayed with debits in red and credits in black.

Figure 5:
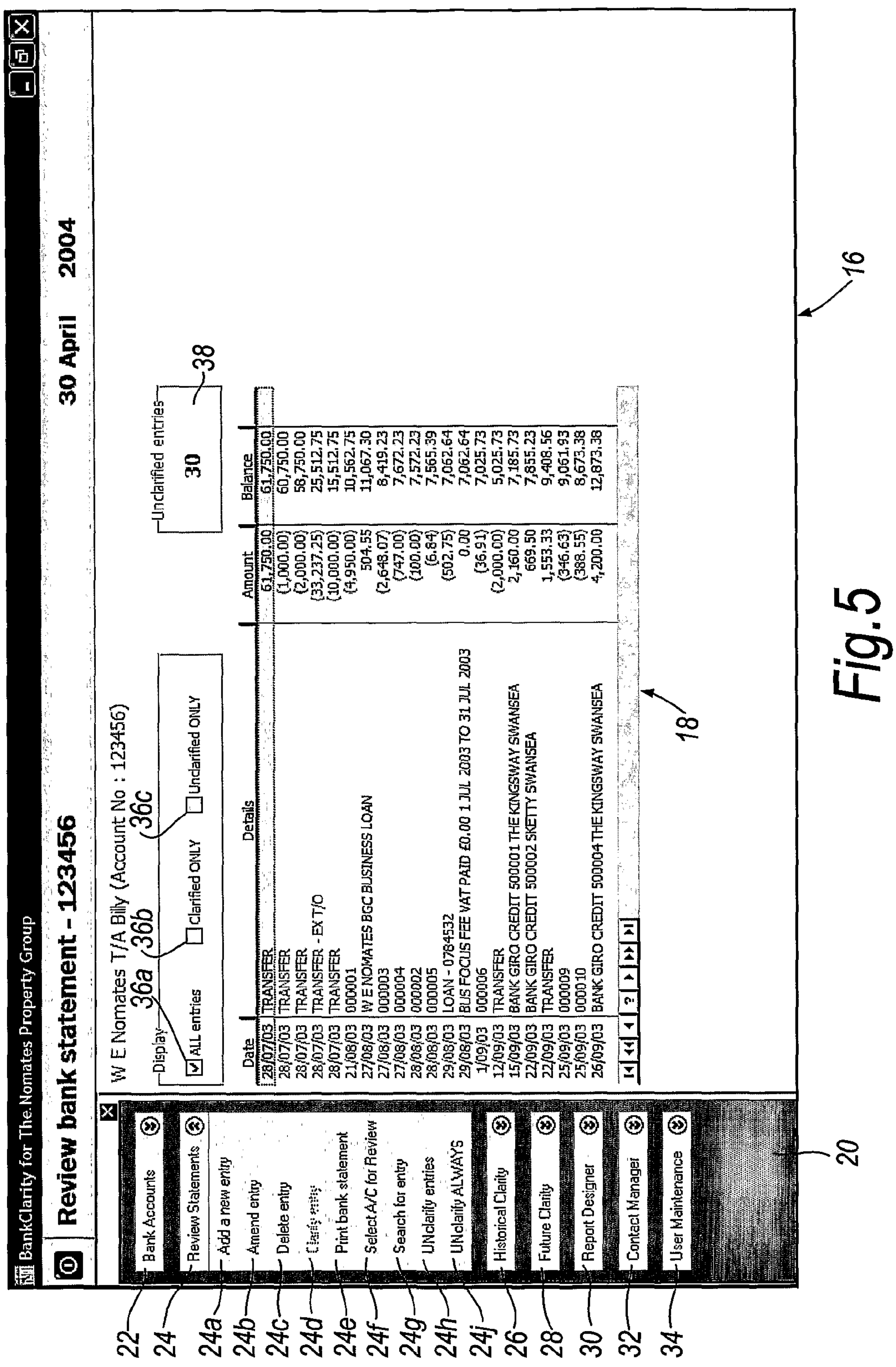
FIG. 5 is a screenshot showing a statement of an exemplary bank account.

In the example of FIG. 5, all statement entries are listed. This is demonstrated by the tick in the tick box 36*a* (ALL entries). Different views can be obtained by selected the "clarified only" tick box 36*b* or the "unclarified" tick box 36*c*.

A clarified entry is an entry that is understood by the software package, i.e. one that has been allocated, as described in detail below. Selecting the tick box 36*c* enables the unclarified entries to be displayed, as shown in FIG. 6.

As indicated in box 38 of the GUI 18, the bank account number 123456 includes 30 unclarified entries. The first entry, a debit of £28.71 dated 30 Sep. 2003 is highlighted in FIG. 6.

Clicking on menu option "clarify entry" 24*d* enables the user to clarify that statement entry. To be clarified, a statement entry needs to be placed within either an expenditure heading or an income heading and to be allocated to a contact (or specifically allocated to "no contact"). Expenditure headings might include loan repayments, rates, rent paid, repairs, stationery and utility bill. Income headings might include bank interest, rent received, cash transfers and capital raised. Headings and contacts, and how they are created, are described in detail below.

Figure 6:
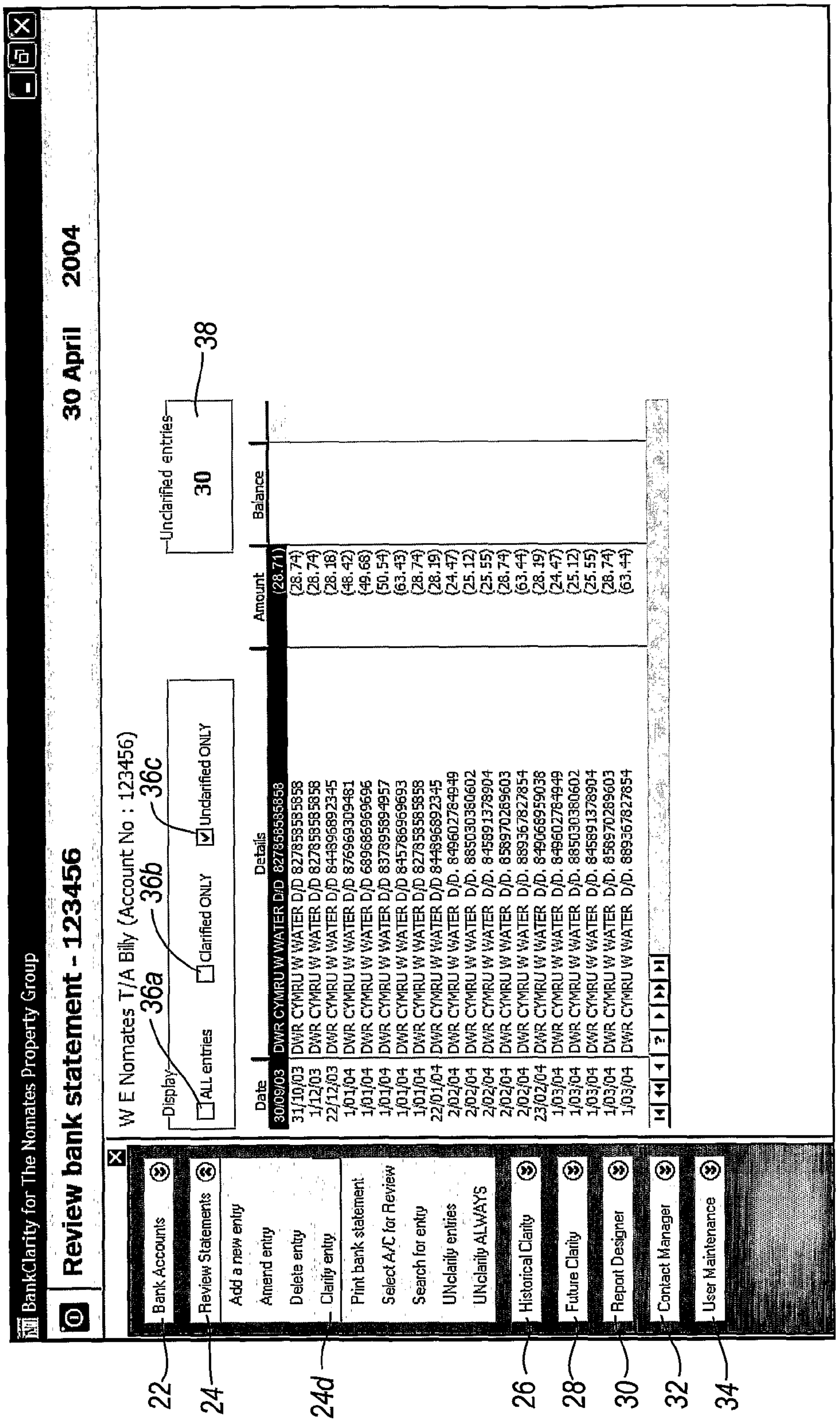
FIG. 6 is a screenshot showing part of an exemplary data clarification process.

The highlighted entry in FIG. 6 is a water rates bill from Welsh Water (as indicated by the detail listing "DWR CYMRU W WATER D/D 827658585858"). The steps required to clarify this entry are shown in FIG. 7.

Figure 7:
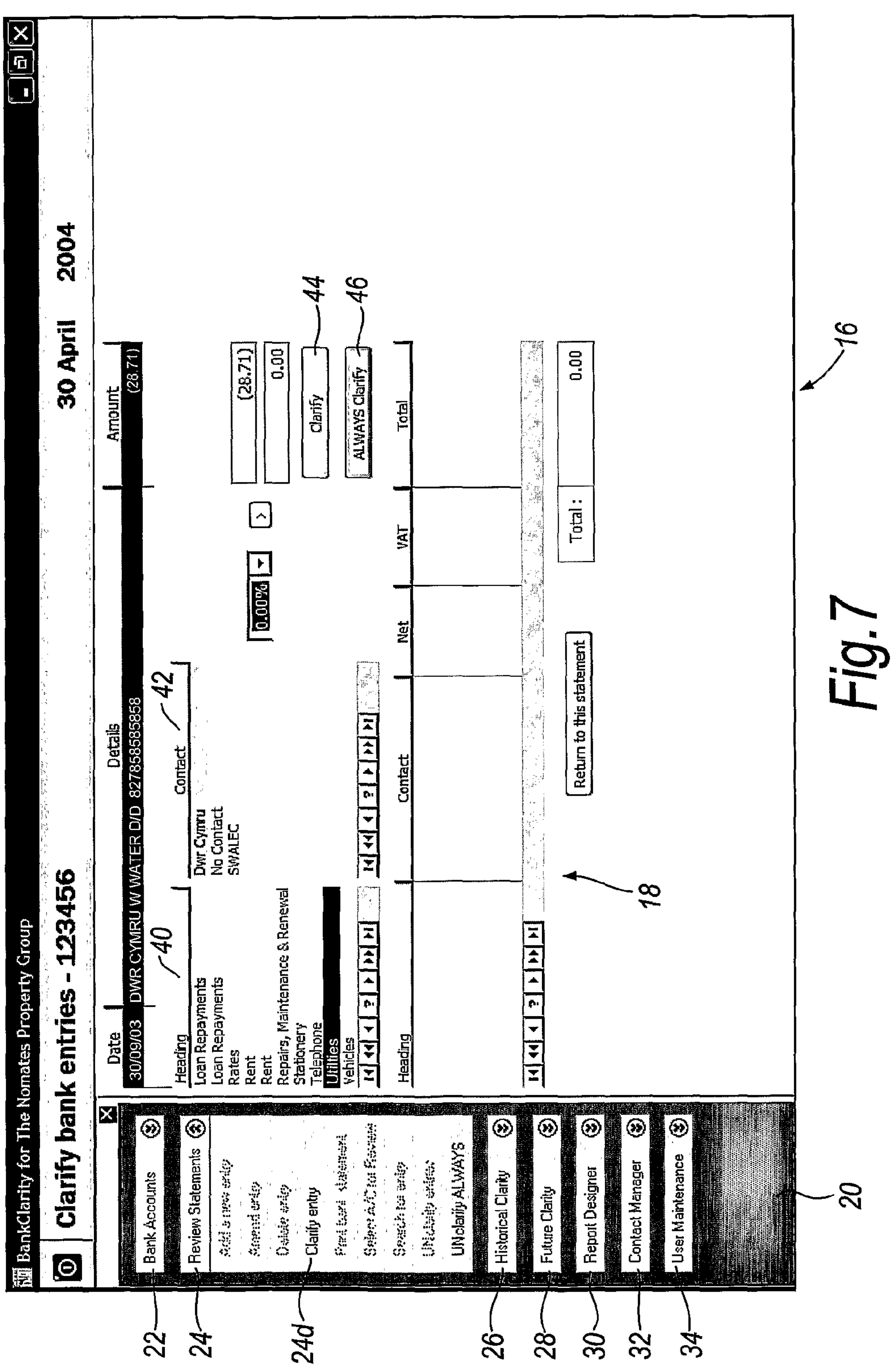
FIG. 7 is a screenshot showing a further part of an exemplary data clarification process.

The unclarified entry (the Welsh Water bill of £28.71 dated 30 Sep. 2003) is highlighted at the top of the area 18 as shown in FIG. 7. A number of possible headings are given in headings list 40. The "utilities" heading is selected (and is highlighted in FIG. 7) since the bill from Welsh Water should be classified as a utilities expenditure. The contacts associated with the utilities heading are listed at area 42. Those headings include "Dwr Cymru" (Welsh Water), which has been highlighted and "SWALEC" (an electricity provider). Accordingly, the entry shown will be allocated as utilities expenditure for which the contact is Welsh Water.

There are three options for clarifying the selected entry. Clicking on the "Clarify" button 44 will clarify the individual entry or "split" the entry into two or more amounts with different contact details. Clicking on the "ALWAYS Clarify" button 46 will clarify all similar entries in the same or similar way.

In the present example, most of the unclarified entries are water rates bills from Welsh Water. As they relate to different properties, the entries have different reference numbers. To provide the flexibility of disallowing the reference number and only rely on the narrative, for example "Welsh Water", the user is able to delete the reference number.

Figure 8:
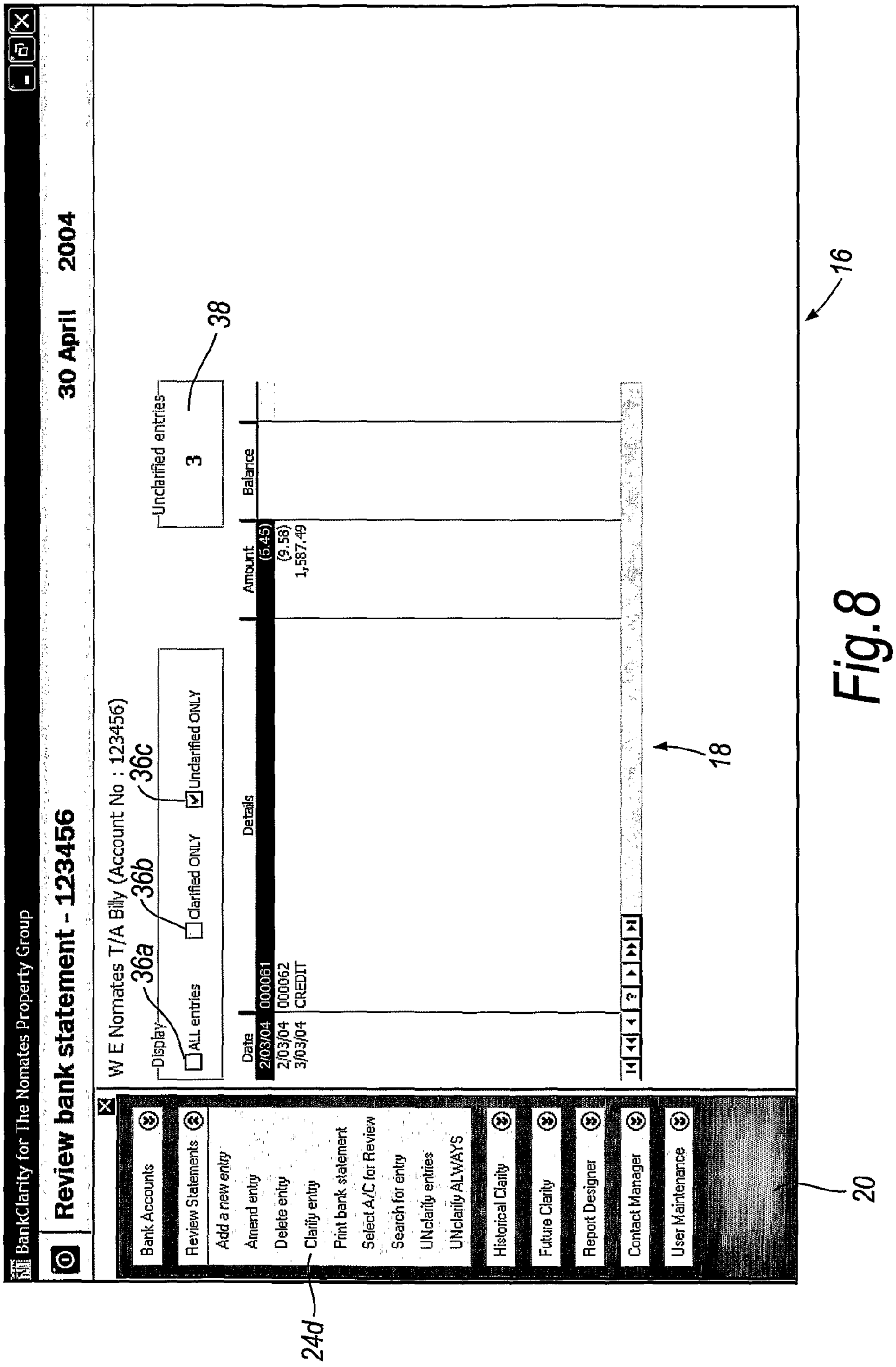
FIG. 8 is a screenshot showing a partially clarified statement of an exemplary bank account.

Selecting the "ALWAYS Clarify" option 46 reduces the number of unclarified options to three, as shown in FIG. 8. It should also be noted that all future water rates bills from Welsh Water will be automatically clarified as utilities expenditure for which the contact is Dwr Cymru (Welsh Water).

The unclarified entry highlighted in FIG. 8 is a cheque payment (cheque number 000061, as noted under "details") dated 2 Mar. 2004 of £5.45 (as noted under "amount") for a periodical magazine obtained from the company WH Smith. This entry should be allocated to the heading "periodicals" and the contact "WH Smith"; however there is no heading "periodicals" and no contact "WH Smith" currently included within the exemplary software package. Thus the heading "periodicals" and the contact "WH Smith" need to be created.

Figure 9:
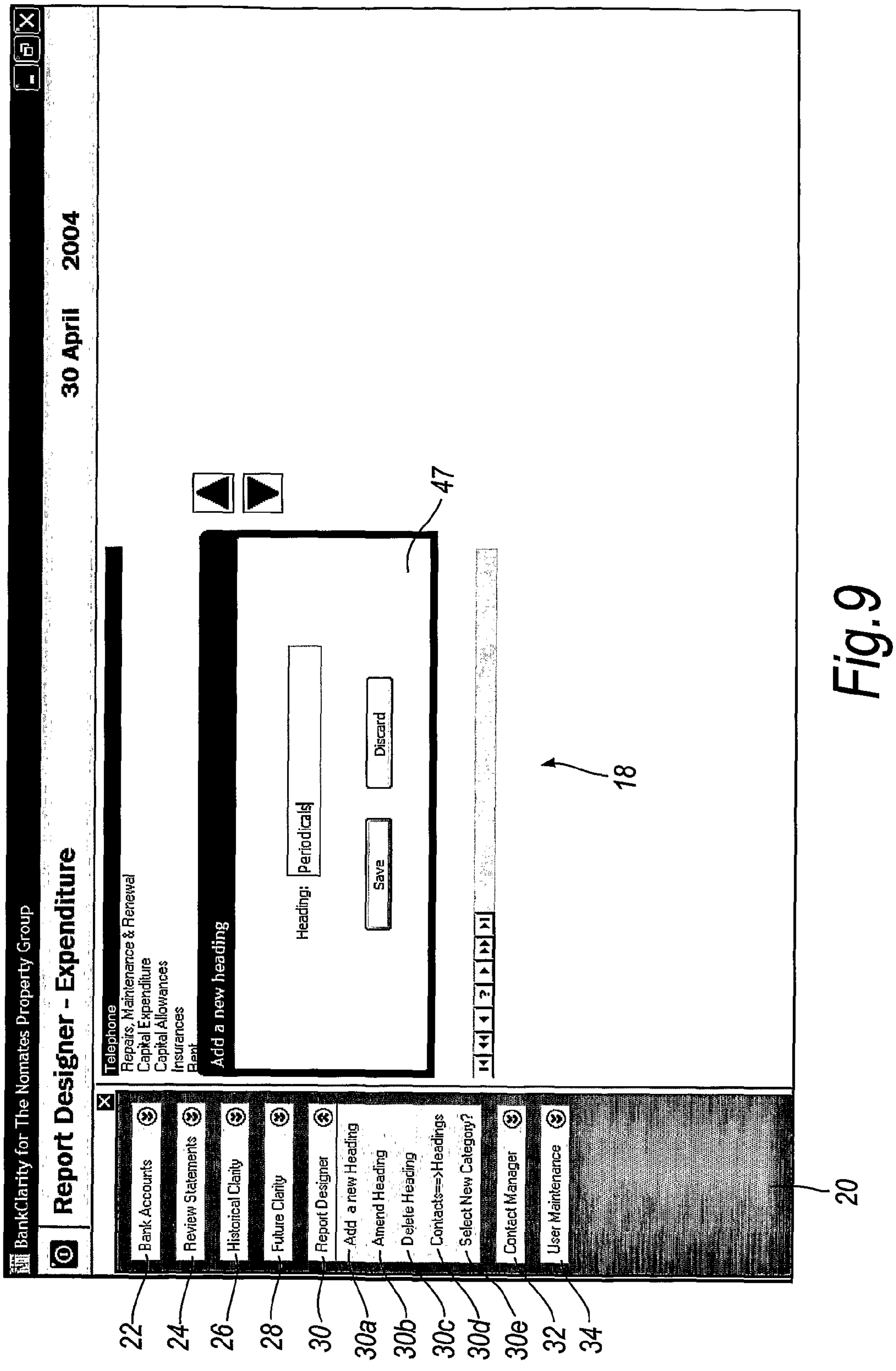
FIG. 9 is a screenshot showing part of a data heading designing process.

A new heading is created using the "Report Designer" menu option 30. In response to clicking on the "Report Designer" option 30, the user is prompted to indicate whether the action required relates to Income or Expenditure. In the present example, Expenditure is selected. In response, the system provides a list of expenditure categories, as shown in FIG. 9. FIG. 9 also shows a number of further options relating to the Report Designer option 30: "Add a new heading" 30*a*, "Amend Heading" 30*b*, "Delete Heading" 30*c*, "Contacts==>headings" 30*d*, "Select New Category" 30*e*.

In the exemplary use of the invention described herein, two categories of data are provided; namely income and expenditure. Other categories could be provided, such as capital. The "Select New Category" option allows such additional categories to be selected.

In the example of FIG. 9, the sub-menu option "Add a new heading" 30*a* has been selected, resulting in a new window 47 being opened that partially obscures the list of expenditure headings (only the expenditure categories "telephone", "repairs, maintenance and renewal", "capital expenditure", "capital allowances", "insurances" and "rent" are visible in FIG. 9—the category "telephone" is highlighted). As shown in FIG. 9, the new heading (Periodicals) is entered in the new window 47 and the user clicks on "Save" to store that new heading. It is noted that the program would not allow the user to enter a heading that had already been entered into the program, as this would be superfluous and confusing.

Figure 10:
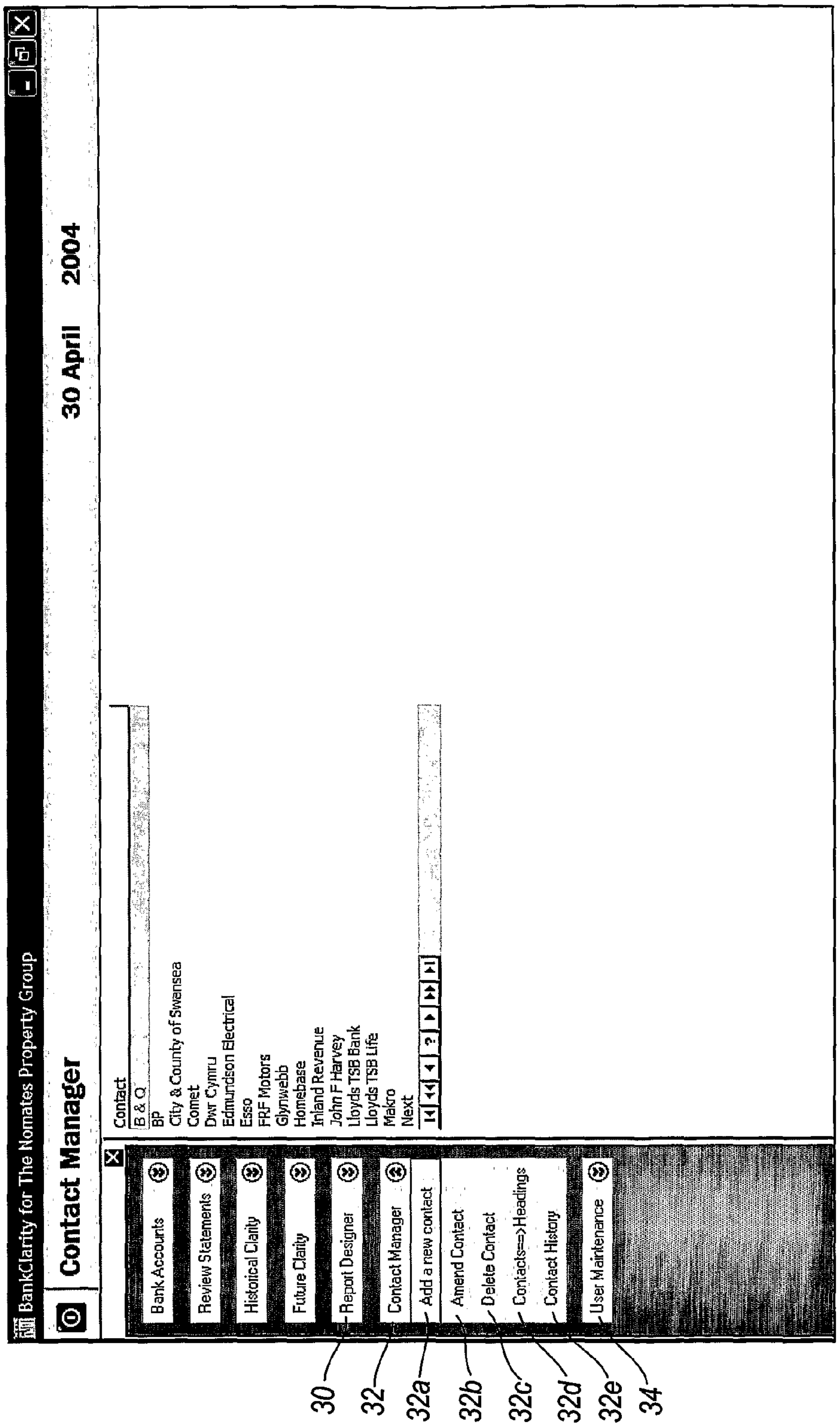
FIG. 10 is a screenshot showing part of a contact designing process.

A new contact is created in a similar way using the "Contact Manager" menu option 32, as described below with reference to FIG. 10. In response to clicking on the "Contact Manager" option 32, the system provides a list of contacts, as shown in FIG. 10. That list includes the contacts "B&Q", "BP", "City & County of Swansea", "Comet", "Dwr Cymru" (Welsh Water), "Edmundson Electrical", "Esso", "FRF Motors", "Glynwebb", "Homebase", "Inland Revenue", "John F Harvey", "Lloyds TSB Bank", "Lloyds TSB Life", "Makro" and "Next". FIG. 10 also shows a number of further options relating to the contact manager option 32: "Add a New Contact" 32*a*, "Amend Contact" 32*b*, "Delete Contact" 32*c*, "Contacts==>Headings" 32*d*, and "Contact. History" 32*e*.

In the example of FIG. 10, the sub-menu option "Add a new contact" 32*a* is selected. In response, a new window is opened (not shown) enabling a new contact (e.g. WH Smith) to be added, in a similar manner to adding a new heading as described above with reference to FIG. 9.

Figure 11:
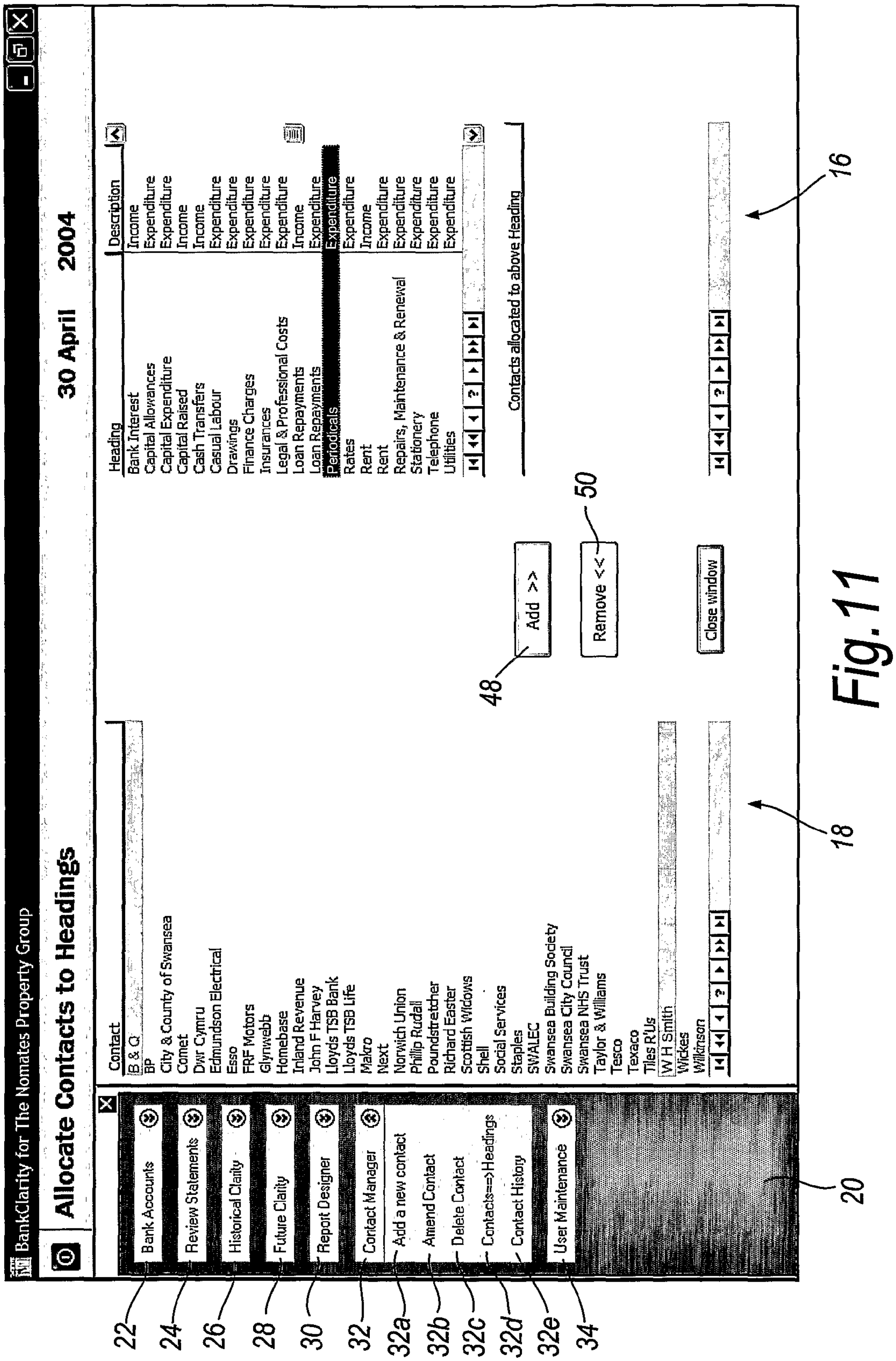
FIG. 11 is a screenshot showing part of a heading and contact designing process.

As described above, a number of contacts may be relevant for a particular heading. For example, a number of different stationery providers might be listed under the expenditure heading "Stationery" so that any transaction allocated to the heading "Stationery" can also be linked to a particular supplier. FIG. 11 demonstrates how contacts are linked to headings.

FIG. 11 shows the GUI 16 after the option "Contacts==>Headings" 32*d* has been selected. The area 18 of the GUI 16 shows a list of contacts on the left hand side and a list of headings on the right. A Heading is highlighted (the expenditure heading "Periodicals" is highlighted in the example of FIG. 11). To add a contact to the Periodicals heading, that contact (e.g. WH Smith) is highlighted and the "Add" button 48 is selected. To remove a contact from a heading, that contact is highlighted and the "Remove" button 50 is selected. It is noted that the program will not allow the same contact to be added to the same heading more that once, in the same way as the program does not allow headings to be duplicated, as outlined above.

Now that the heading "Periodicals" and the contact "WH Smith" have been defined, the payment of £5.45 can be clarified.

As described above with reference to FIGS. 4 to 8, in order to clarify an entry, the menu option "Review Statements" 24 is selected and the relevant account (Account Number 123456 in this example) is selected. Next, the unclarified entry is highlighted and the "clarify entry" sub-menu 24*d* is selected, as shown in FIG. 8.

Figure 12:
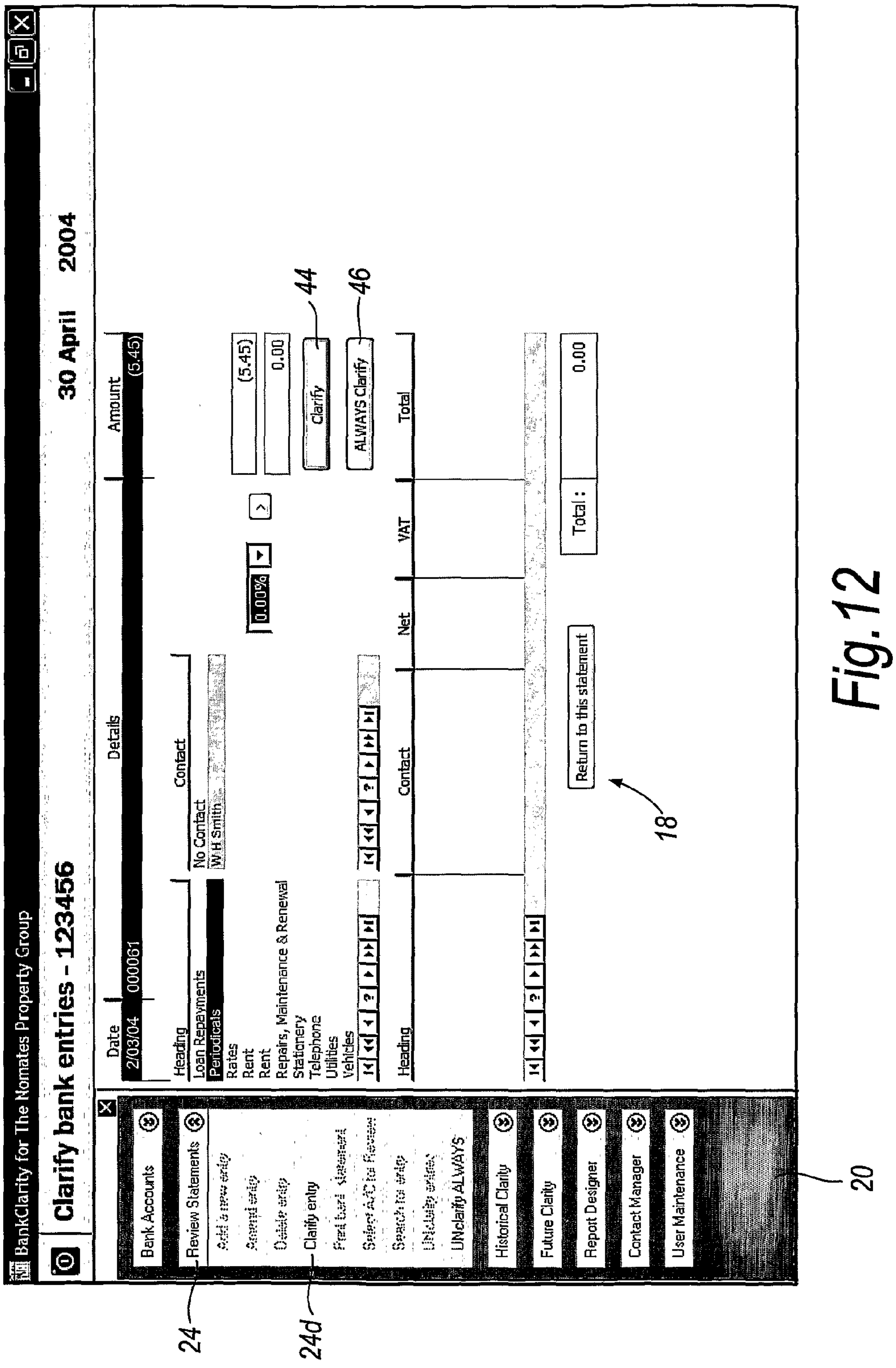
FIG. 12 is a screenshot showing part of a further data clarification process.

The debit of £5.45 (cheque number 000061 dated 2 Mar. 2004, as highlighted in FIG. 12) can now be allocated to the "Periodicals" heading by highlighting that heading as shown in FIG. 12. With the periodicals heading highlighted, the contacts in that heading are listed and the contact "WH Smith" can now be selected, as shown in FIG. 12. Finally, the "Clarify" button 44 is pressed to clarify that entry. Note that in this case, the "Clarify" button is selected rather than the "ALWAYS Clarify" button 46, since, if the "ALWAYS Clarify" button 46 was selected, then all cheque payments would be allocated to the heading "periodicals" and the contact "WH Smith".

An unclarified credit of £1587.49, dated 3 Mar. 2004, is listed in the example of FIG. 8. For the purposes of this example, that credit consists of a cash transfer of £1000 (nil VAT) and a rental cheque of £587.49 from Swansea City Council (standard rate VAT).

Figure 13:
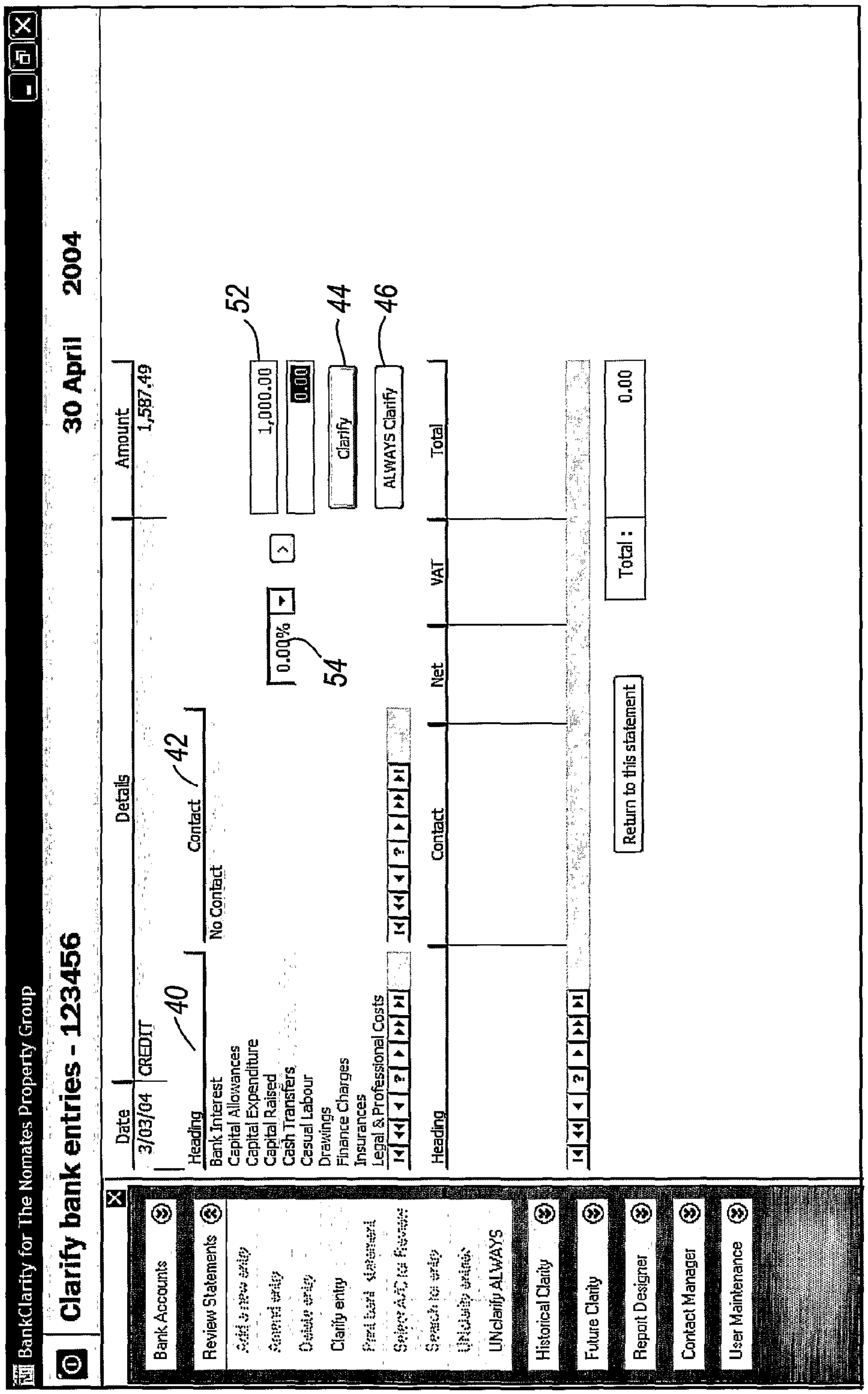
FIG. 13 is a screenshot showing a further part of the data clarification process of FIG. 12.

The credit of £1587.49 can now be clarified by highlighting that entry in the list of unclarified entry (see FIG. 8) and selecting the "Clarify entry" option 24*d*. The amount £1000 is entered in the total box 52 as shown in FIG. 13 and the heading "Cash Transfers" selected from the list of headings 40. No contact is relevant (indeed, no contacts are listed in the list of contact 42). The "Clarify" button 44 is then selected to clarify that £1000 cash transfer. Next the £587.49 rent cheque is clarified. The amount £587.49 is entered in the total box 52 and the VAT rate set to 17.5% in VAT box 54, as shown in FIG. 14. Although not shown in FIG. 14, the heading "Rent" should be selected and the contact "Swansea City Council" should be selected. The clarify button 44 should then be selected.

Thus, all entries in the downloaded statement have been clarified with one exception, a cheque payment (cheque number 000062, dated 2 Mar. 2004) of £9.58.

In an alternative form of the invention, the "clarify bank entries" screens shown in FIGS. 7, 12, 13 and 14 include a tick box (not shown) labelled "No Invoice". Checking the "No Invoice" box prior to clarifying an entry ensures that any invoice control algorithm that may be used does not attempt to match the entry with an invoice. This feature is useful for payments, such as bank charges and insurance premiums, for which invoices are not typically generated.

In addition to clarifying entries in the bank statement, the reverse process can be performed by unclarifying entries. This might be required if mistakes have occurred, or if the user has decided to re-organise the clarification system. The menu options "Unclarify entries" 24*h* and "Unclarify always" 24*j* are provided to enable this process to be readily achieved.

Figure 15:
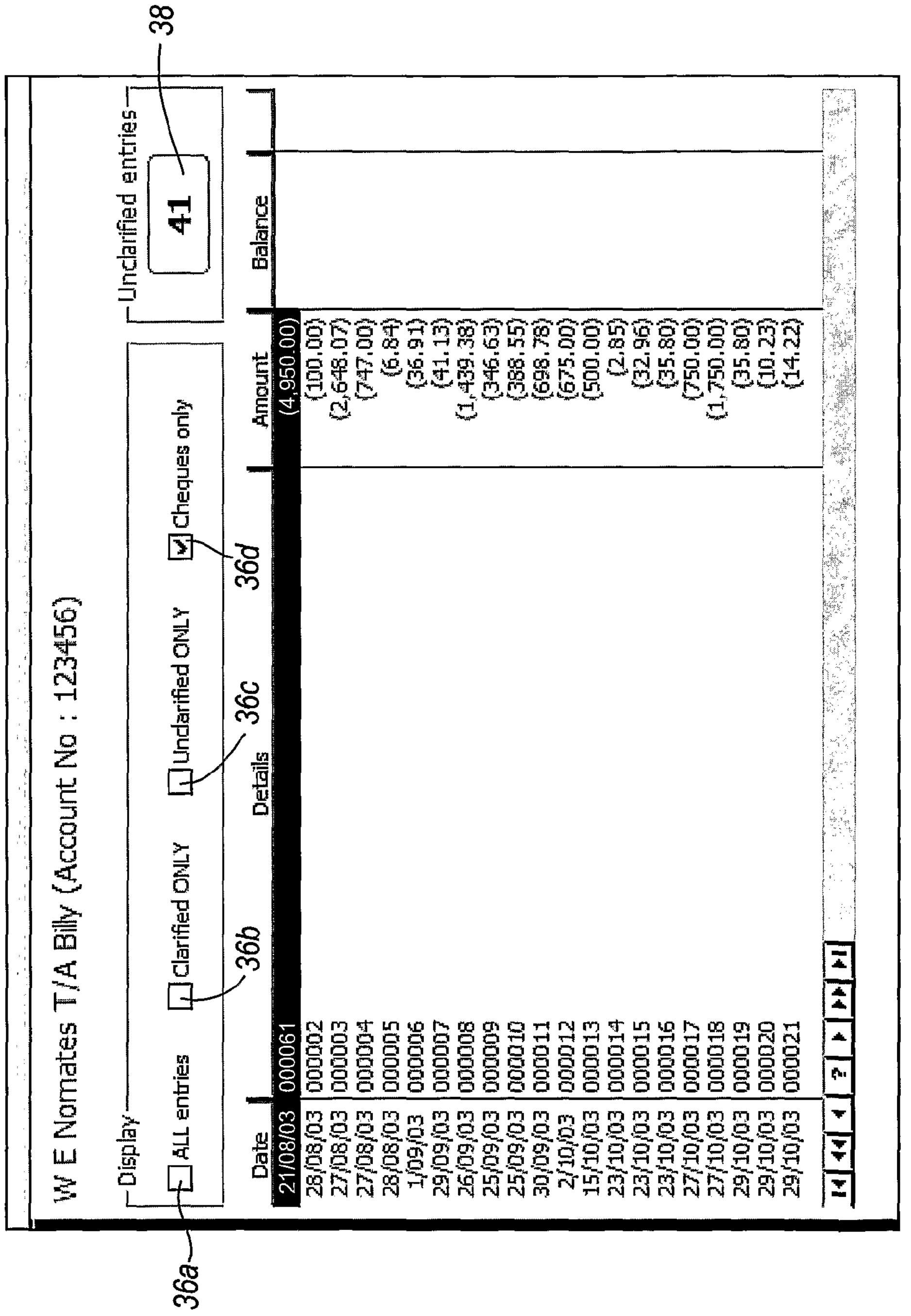
FIG. 15 is a screenshot showing a statement of an exemplary bank account showing a variant of the graphical user interface shown in FIG. 5

FIG. 15 shows a variant of the area 18 of the graphical user interface shown in FIG. 5. In the example of FIG. 15, the "all entries" tickbox 36*a*, "clarified only" tick box 36 and "unclarified" tickbox 36*c* are all present and have the functionality described above. In addition, a "cheques only" tickbox 36*d* is also present. Cheque number 000001 (a debit of £4950, dated 21 Aug. 2003) is highlighted in FIG. 15.

As shown in FIG. 15, selecting the "cheques only" tickbox lists all of the cheques included in the system. In the example of FIG. 15, the cheques are specifically listed in numerical order, as this will enable the user to easily identify cheques which have not yet been presented by comparing the numerical listing with the user's chequebook which is also in numerical order.

Furthermore, a function may be provided in which only unclarified cheques are listed. This functionality is powerful since cheques often represent a high proportion of items that are not automatically clarified, since the information content provided by a cheque is often low.

To support the cheque reconciliation facility, the user may be given the option to pre-load amounts and payees of the cheques in advance. By utilising the schedule of numerically ordered cheques outlined above, and filtering out cheques already presented, the program will be able to provide the user with a schedule of unpresented cheques, and amounts, if pre-loaded. Further, the user may be able to indicate that a cheque will never be presented for payment, this may be appropriate, for example, if the cheque is lost.

In one form of the invention, an operator may be able to set an "operational date" of an entry that differs from that recorded at the bank. This can be particularly useful with cheques. For example, consider a company having a financial year that ends at the end of June. If a cheque is written on 27 Jun. 2005, but is paid by the bank on 2 Jul. 2005, that payment should, for accounting purposes, be included in the financial year ending at the end of June 2005. In the example given above, the cheque payment will be recorded by the bank on 2 Jul. 2005, but the operator can set an "operation date" of that cheque as 27 Jun. 2005.

Figure 16:
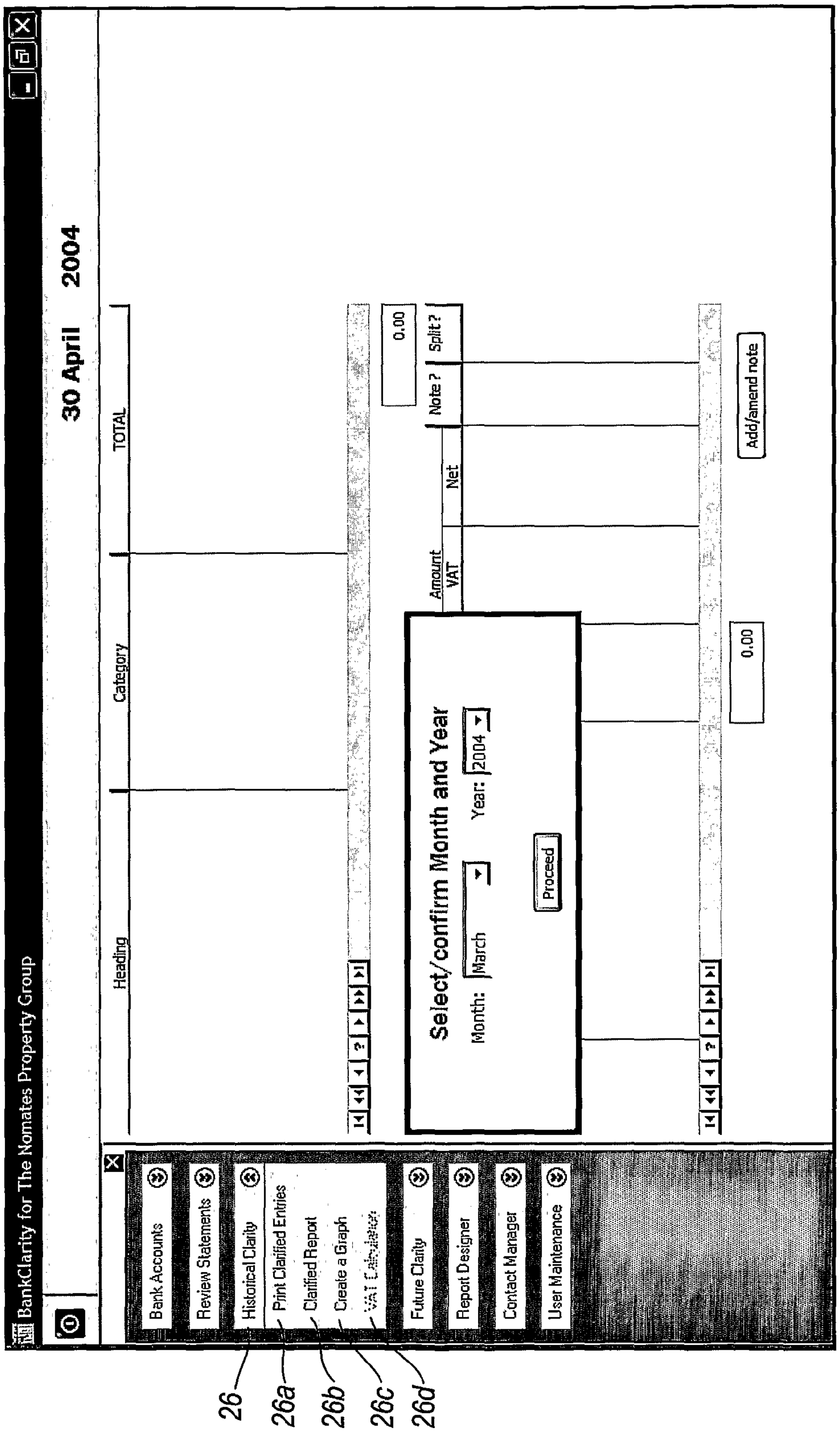
FIG. 16 is a screenshot showing part of an historical analysis process.

An operator of the software can review the financial situation of the Nomates Property Group for any financial period covered by the downloaded statements. For example, the financial position of the Group can be reviewed for the 12 months to the end of March 2004 by making use of the Historical Clarity function. In order to do this, the "Historical Clarity" menu option 26 is selected. In response a window is opened, as shown in FIG. 16 asking the user to specify the period over which the analysis is to take place. When the user clicks on proceed, the software calculates the total income and expenditure over the relevant period.

As described above, some entries may have an operational date that is different to the date recorded by the bank. In one form of the invention, an operator is able to select whether the historical analysis should be based on the dates recorded by the bank, or on the operational dates.

Figure 17:
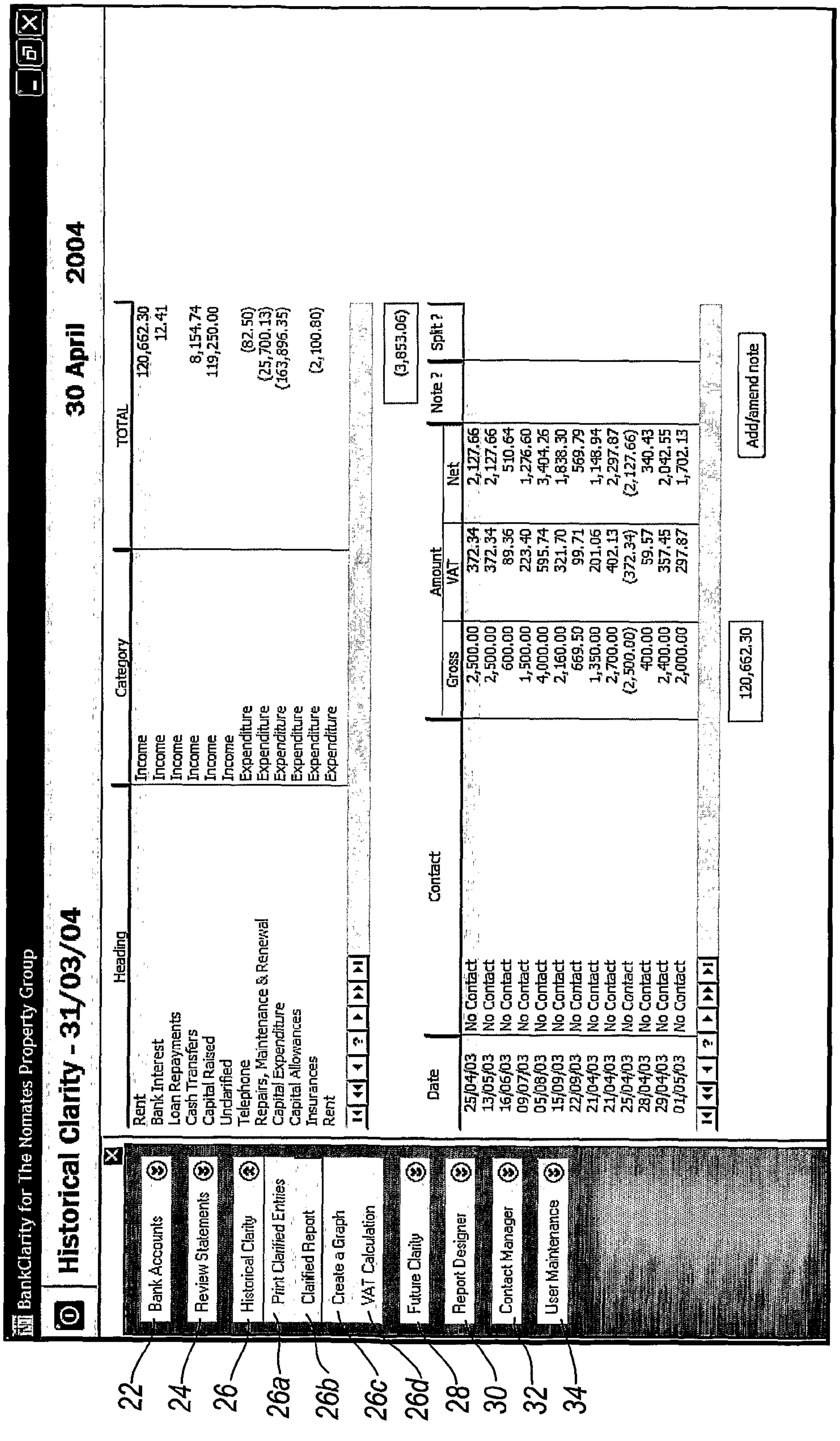
FIG. 17 is a screenshot showing a further part of the historical analysis process of FIG. 16.

FIG. 17 shows the total income in each income heading ("rent", "bank interest", "loan repayments", "cash transfers", "capital raised" and "unclarified") and expenditure in each expenditure heading ("telephone", "repairs, maintenance & renewal", "capital expenditures", "capital allowances", "insurances" and "rent") for the period from end March 2003 to end March 2004. A schedule of entries of each data heading can be generated. Further, by selecting sub-menu option "Clarified Report" 26*b*, a Cashflow Schedule for the same period is generated, as shown in FIG. 18. As shown in FIG. 18, the cashflow schedule essentially displays the data of FIG. 17 on a month-by-month basis.

By selecting the option "Print clarified entries" 26*a*, the clarified entries can be printed in a number of formats.

By selecting the option "Create a Graph" 26*c*, a number of graphical representations of the data can be generated, such as income and expenditure pie charts and cash balance charts. Such graphical representations of data are well known in the art and will not be discussed further here.

By selecting the option "VAT Calculation" 26*d*, a VAT return can be prepared for a user-defined period. This is a simple calculation since all of the data required for this calculation is known to the program. As can be seen, each data entry in the present example is given a VAT coding (e.g. 0% or 17.5%). A VAT return can be calculated from this coding information in a manner well known in the art.

It would be apparent to the person skilled in the art that other functions could be provided for further analysis of the historical data.

In addition to reviewing the financial situation of the Nomates Property Group for any financial period covered by the downloaded statements, future predictions can be made using the Future Clarity function. In order to do this, the "Future Clarity" menu option 28 is selected. In response a forecast wizard is initiated, as shown in FIGS. 19 to 21.

Step 1 of the forecast wizard asks the user to define the period on which the forecast is to be based. Step 2 asks the user to define the number of months on which the forecast is based. Step 3 of the forecast wizard asks the user to define the end month of the forecast. In the example of FIGS. 19 to 21, the forecast is a 12-month forecast from the end of March 2004 to the end of March 2005, that forecast being based on the data for the 12 months up to the end of March 2004.

Figure 21:
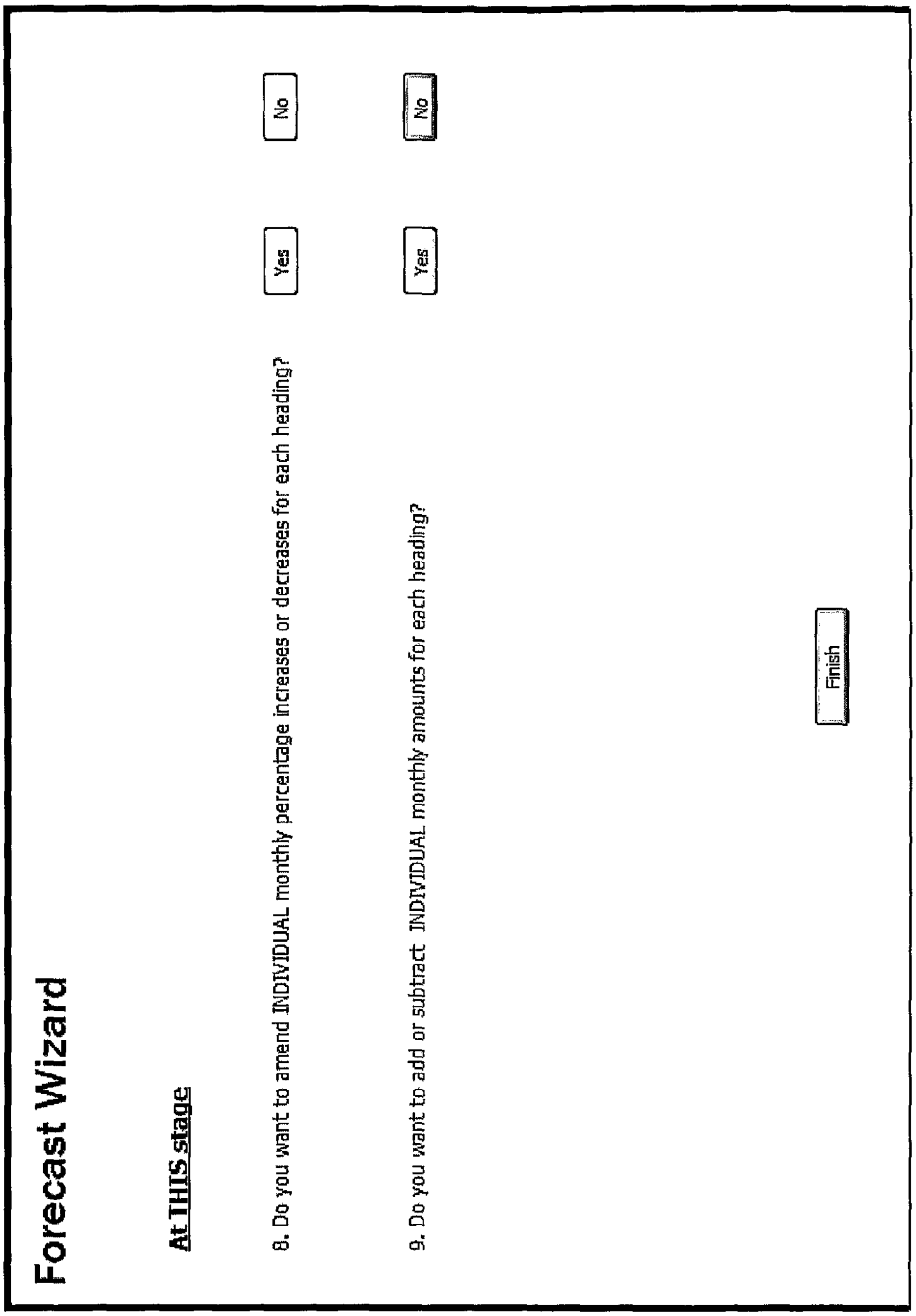
FIG. 21 is a screenshot showing a third part of the exemplary forecast wizard of FIGS. 19 and 20.

Steps 4 and 5 ask the user to enter a title and description of the forecast and step 6 asks the user to define an opening balance (−£99 in the example of FIGS. 19 to 21).

At step 7, each of the user-defined headings is listed and the user is given the option of specifying a percentage increase or decrease in the income or expenditure (as appropriate) for each heading. In the example of FIGS. 19 to 21, the only change from the previous 12-month period is a 25% increase in legal & professional costs. By specifying 25% at step 7, the legal & professional cost estimate for each of the next 12 months will be 25% greater than for the corresponding month of the previous year.

Step 8 allows the user to vary the percentage increase on a month-by-month basis. Step 9 allows the user to add (or subtract) absolute values on a month-by-month basis.

A further step that could be added to the wizard would be to allow the user to overwrite some of the figures for the previous year with new absolute values, for example on a month-by-month basis.

Additionally, an operator may be able to select whether the analysis should be based on the dates recorded by the bank, or on the operational dates, for the reasons given above.

FIG. 22 shows a month-by-month cashflow schedule prediction for March 2004 to March 2005. The predication is based on the data for March 2003 to March 2004, with a 25% increase in the legal & professional costs for each month.

Figure 23:
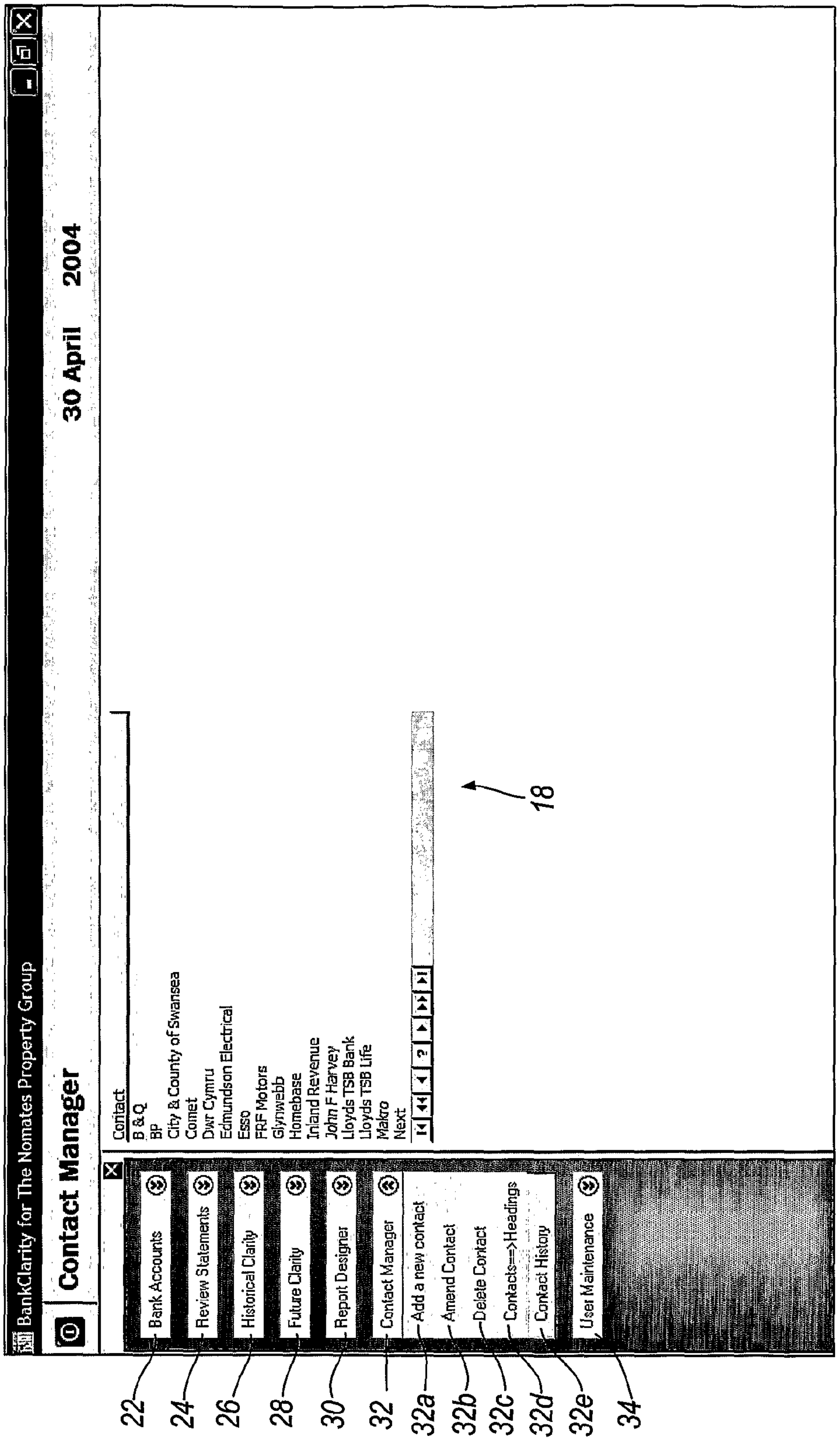
FIG. 23 is a screenshot demonstrating the use of an exemplary contact manager.
Figure 24:
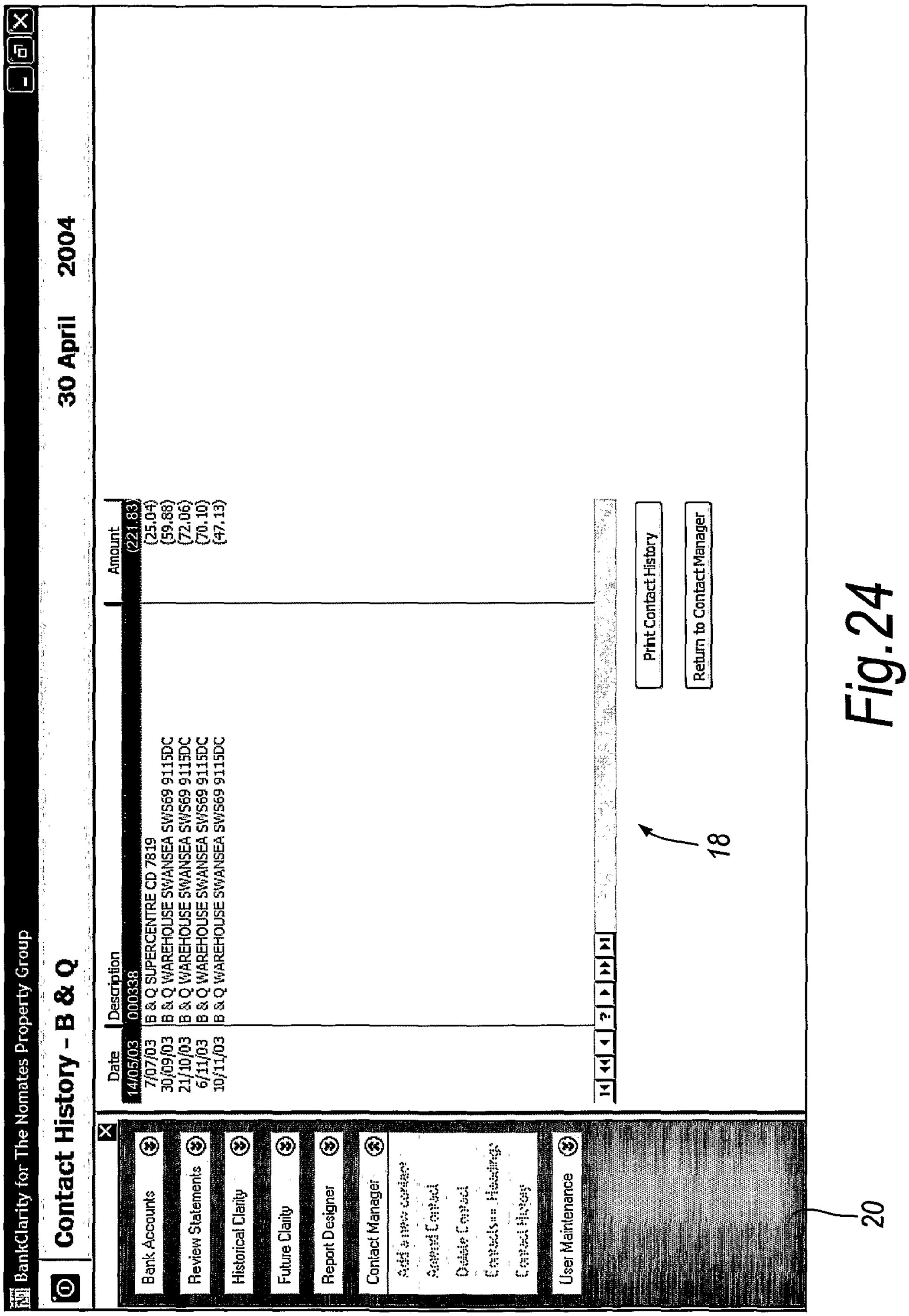
FIG. 24 is a screenshot showing an exemplary output of the contact manager shown in FIG. 23.

As described above, the Report Designer 30 and the Contact Manager 32 can be used to manage heading and contacts respectively. The Report Designer can be used to add headings using the menu option 30*a*, as described above, and can also be used to amend or delete existing headings using options 30*b* and 30*c* respectively. The Contact Manager can be used to add a new contact using the menu option 32*a*, as described above, and can also be used to amend and delete existing contacts using the options 32*b* and 32*c* respectively. In addition, by selecting sub-menu "Contact History" 32*e*, a list of contacts is obtained, as shown in FIG. 23. Selecting one of those contacts (for example B&Q), a list of all transactions associated with that contact is obtained, as shown in FIG. 24, in which a cheque payment of £221.83 (cheque number 000338 dated 14 May 2003) is highlighted.

In the embodiments of the invention described above, the end user is required to clarify transactions. This is not essential as the clarification steps may be partially or wholly carried out at the source of the data (e.g. a financial institution) or by an intermediary (e.g. the supplier of the end user's software).

Consider, for example, the scenario in which user has a bank account with a financial institution. That financial institution may set up a database of statement narratives and pre-loaded headings. This database could then be used to pre-clarify the data prior to delivery to the end user. From the end user's point of view, this would result in a further automation of the clarification process.

As noted above, the pre-clarification step described above may be carried out either at the financial institution or by an intermediary. In the case where an intermediary carries out the pre-clarification steps, the intermediary would receive the raw financial data from the financial institution and would either deliver the pre-clarified data to the end user, or return pre-clarified data to the financial institution for delivery to the end user.

Figure 25:
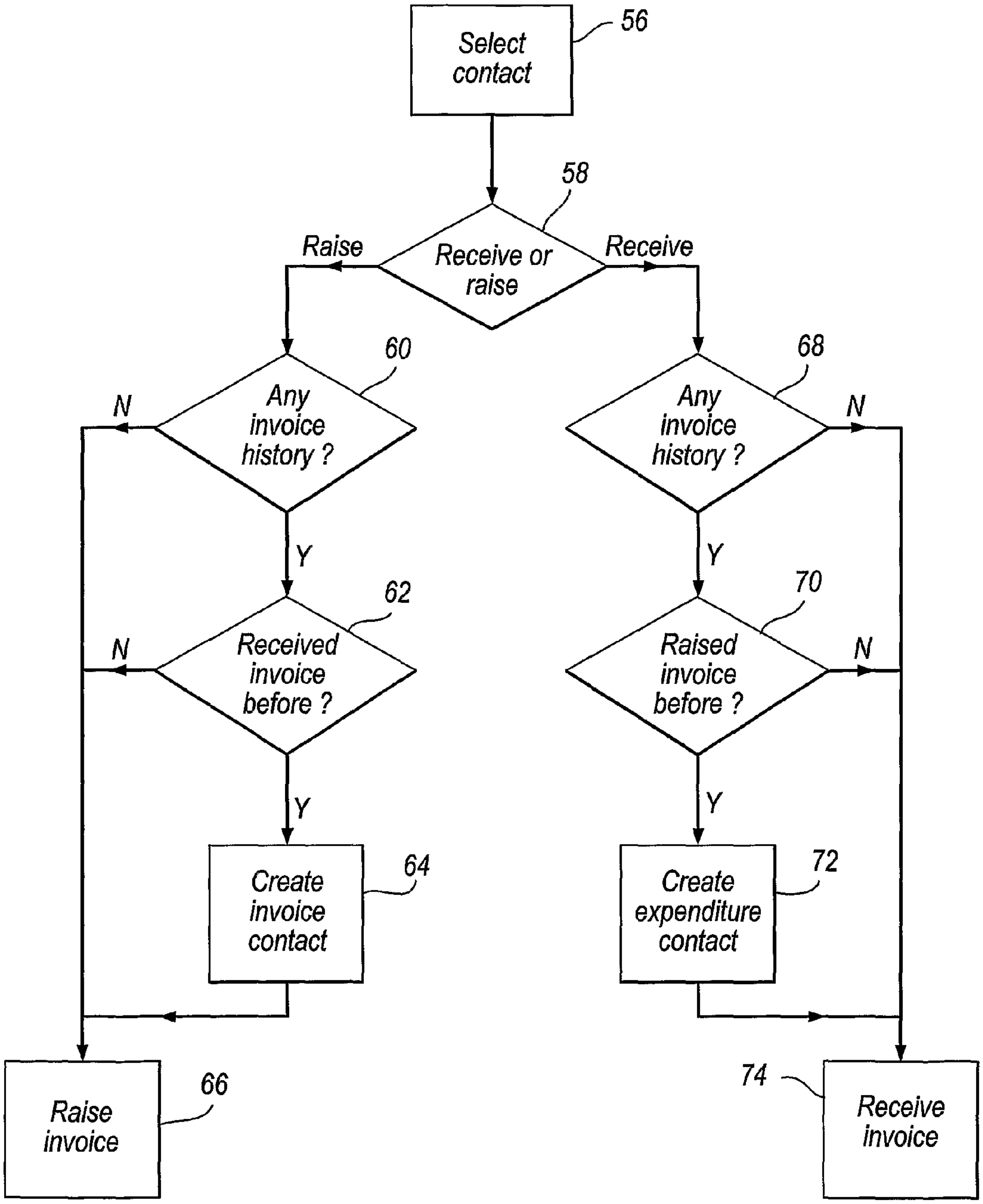
FIG. 25 is a flow chart showing steps of an invoice control algorithm.

FIG. 25 is a flow chart showing steps of an invoice control algorithm of the present invention. The invoice control algorithm provides a mechanism for the raising and receiving of invoices and also tracks payment of those invoices against bank entries.

In an embodiment of the present invention, no reference is made to "Debtors" or "Creditors" and sales and purchase ledgers are maintained in a manner that is not readily apparent to the user. Accordingly, the user is not required to understand the workings of sales and purchase ledgers in order to raise and receive invoices.

When an invoice is received or raised, the operator selects a "Contact" from the contact list as shown in step 56 of the algorithm of FIG. 25. At step 58, the operator indicates whether an invoice is to be raised (in which case the algorithm proceeds to step 60) or received (in which case the algorithm proceeds to step 68). It should be noted that the user does not need to consider whether the contact is a Debtor or Creditor, or whether the invoice relates to the Sales Ledger or the Purchase Ledger; the user merely has to indicate whether the invoice is being raised or received.

At step 60, the algorithm determines whether invoices have previously been either raised or received from the contact in question, i.e. whether there is any invoice history for the contact selected at step 56. If not, then the algorithm proceeds directly to step 66, where the invoice is raised (described further below). If the selected contact has an invoice history, then the algorithm moves to step 62, which step specifically asks whether an invoice has been received for that client before. If not (indicating that an invoice must previously have been raised, i.e. that the contact is an income contact), the algorithm moves to step 66, otherwise the algorithm moves to step 64.

At step 64, the algorithm generates an income version of the contact (the existing contact must be an expenditure contact) before proceeding to step 66. In order to generate an income version of the contact, the algorithm copies all of the details of the existing expenditure (or Purchase Ledger) contact (such as the name and address of the contact) into a new income (or Sales Ledger) contact. To operate the hidden Sales and Purchase ledgers, the program annotates an "I" after the Sales Ledger version of the Contact and an "E" after the Purchase Ledger version.

At step 66, a Raise Invoice algorithm is executed. The Raise Invoice algorithm "posts" the invoice to the Sales Ledger and at the same time displays the Contact in black to indicate that invoices relating to that Contact are for Income.

At step 68, the algorithm determines whether invoices have previously been either raised or received from the contact in question (i.e. whether the contact selected at step 56 has an invoice history). If not, then the algorithm proceeds directly to step 74, where the invoice is received (described further below). If an invoice has been either raised or received before, the algorithm moves to step 70, which step specifically asks whether an invoice has been raised for that client before. If not (indicating that an invoice must previously have been received, i.e. that the contact is an expenditure contact), the algorithm moves to step 74, otherwise the algorithm moves to step 72.

At step 72, the algorithm generates an expenditure version of the contact (the existing contact must be an income contact) before proceeding to step 74. In order to generate an expenditure version of the contact, the algorithm copies all of the details of the income (or Sales Ledger) contact (such as the name and address of the contact) into a new expenditure (or Purchase Ledger) contact. To operate the hidden Sales and Purchase ledgers, the program annotates an "I" after the Sales Ledger version of the Contact and an "E" after the Purchase Ledger version.

At step 74, a Receive Invoice algorithm is executed. The Receive Invoice algorithm "posts" the invoice to the Purchase Ledger and displays the Contact in red to indicate Expenditure.

Thus, in order to raise or receive an invoice, the operator need only identify the relevant contact, and indicate whether an invoice is to be raised or received. No further action is required by the user. In particular, the operator does not need to know whether the invoice relates to income or expenditure, or whether it should be recorded on a Purchase Ledger or a Sales Ledger.

In cases of Contacts who have both Sales and Purchase Ledgers entries, the User will in future only have the option to raise invoices against any Contact with an "I" suffix or receive invoices from a Contact with an "E" suffix. For example, if invoices are both raised and received against the firm ABC Newsagents, sales to ABC Newsagents should be recorded in the hidden Sales Ledger against the contact ABC Newsagents [I] and purchases from ABC Newsagents should be recorded in the hidden Purchase Ledger against the contact ABC Newsagents [E].

In one form of the invention, if the operator selects an income contact at step 56, the "receive invoice" option at step 58 is hidden to ensure that an invoice is not received from an income contact. Similarly, if the operator selects an expenditure contact at step 56, the "raise invoice" option at step 58 is hidden to ensure that an invoice is not raised against an expenditure contact. Ensuring that invoices are not raised or received against the wrong sort of contact could be achieved in a number of other ways. For example, if the operator attempts to raise an invoice against an expenditure contact for which an income contact exists, the user may be prompted to use the income contact. Alternatively, the income contact may be used automatically. Similarly, if the operator attempts to receive an invoice from an income contact for which an expenditure contact exists, the user may be prompted to use the expenditure contact. Alternatively, the expenditure contact may be used automatically.

Figure 26:
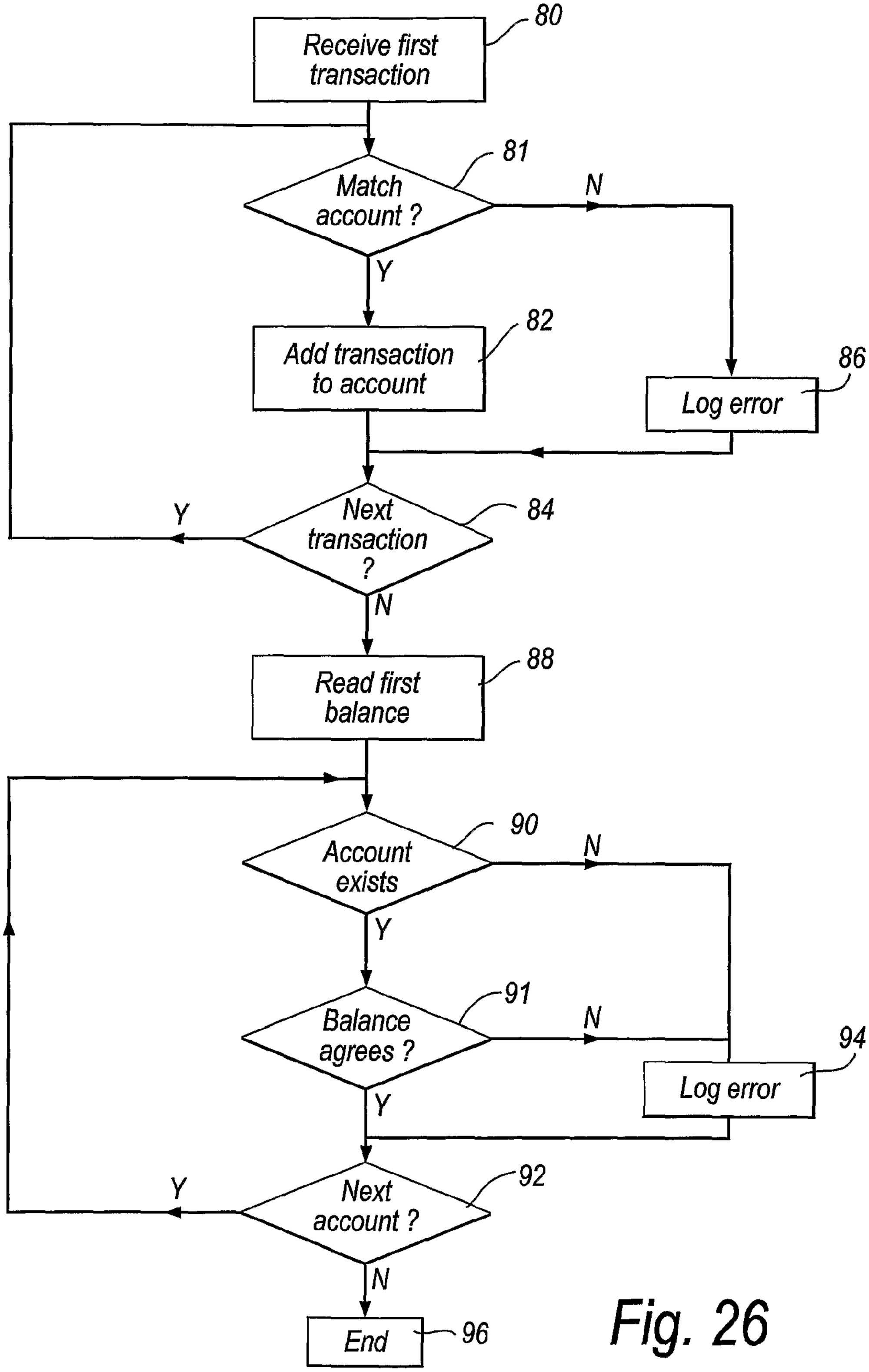
FIG. 26 is a flow chart showing steps of a bank multiple client account transaction import algorithm.

FIG. 26 is a flow chart showing steps of a bank multiple client account transaction import algorithm of the present invention.

The bank multiple client account transaction import algorithm of the present invention provides a mechanism for the receiving of an export file from a bank which contains all statement transactions for a specified period for a group of a bank's customers. An example of a grouping would be all the clients of a Trust Company.

The export file contains a list of transactions together with information identifying the accounts to which the transactions relate. A separate file including the closing balance of each of the accounts is also sent. In an alternative arrangement, the file containing the list of transactions could also include the data relating to the closing balance of each account.

The algorithm of FIG. 26 starts at step 80 where the first transaction in the export file is received. The algorithm proceeds to step 81 which determines whether the account relating to the transaction is known to the program implementing the algorithm. If the account is known, the algorithm moves to step 82, which step adds the transaction to that account before proceeding to step 84. If the account is not known to the program, that fact is noted in an error log at step 86 and the algorithm proceeds to step 84.

At step 84, it is determined whether or not there are any further transactions in the export file. If there are further transactions, the algorithm returns to step 81, where it is determined whether or not the account relating to the next transaction is known. When it is determined at step 84 that there are no further transactions, the algorithm proceeds to step 88.

As noted above, the balance of all of the accounts to which the export file relates is received, either as part of the same export file, or in a separate file. Once all of the transactions have been processed by steps 80 to 86 described above, the local balances should all match the balances stored at the bank.

At step 88, the first account balance is read. The algorithm proceeds to step 90, which step determines whether or not that account is known to the program running the algorithm. If the account is known, the algorithm proceeds to step 91, which step determines whether or not the local balance agrees with that given in the export file. If the balance agrees, the algorithm moves to step 92, If step 90 determines that the account is unknown to the algorithm, that fact is noted in an error log at step 94 and the algorithm proceeds to step 92. If step 91 determines that the balance does not agree, that fact is noted in the error log at step 94 and the algorithm proceeds to step 92.

At step 92, it is determined whether or not there are any further bank account balances included in the export file. If there are further balances, the algorithm returns to step 90, where it is determined whether or not the account relating to the next account balance is known. When it is determined at step 92 that there are no further account balances stored in the export file, the algorithm proceeds to step 96, at which point the algorithm terminates.

Thus, the bank multiple client account transaction import algorithm reads each transaction record of the bank export file in turn, and then looks for the client that "owns" that bank account. The transaction is then added to that client's bank account and the process is repeated for each transaction in the export file. If a particular bank account cannot be identified, that information is logged and provided to the User at the end of the process.

After allocating or logging all transactions, the present invention then rebuilds all of the transactions for each individual bank account, to ascertain the closing balance.

This closing balance is then compared with an "all balances" file produced by the bank. Any discrepancies are logged. It should be noted that the closing balance check could be performed at a different time, for example as part of an audit procedure. This could be instead of, or in addition to, the check described above that takes place immediately after the transactions have all been allocated to the appropriate bank accounts.

The balance checking procedure is provided to ensure that all transactions have been captured and allocated to the correct account and to ensure that all balances for all clients' bank accounts with that bank synchronise with the records held in the program of the present invention.

The present invention also provides a progress management algorithm. The progress management algorithm is a management tool which provides an overview of the various stages of workflow of the whole of the client base of a business. For example, the algorithm may be used to monitor when bank account details have been downloaded for each client and whether downloaded bank account details have been clarified, as described above.

Figure 27:
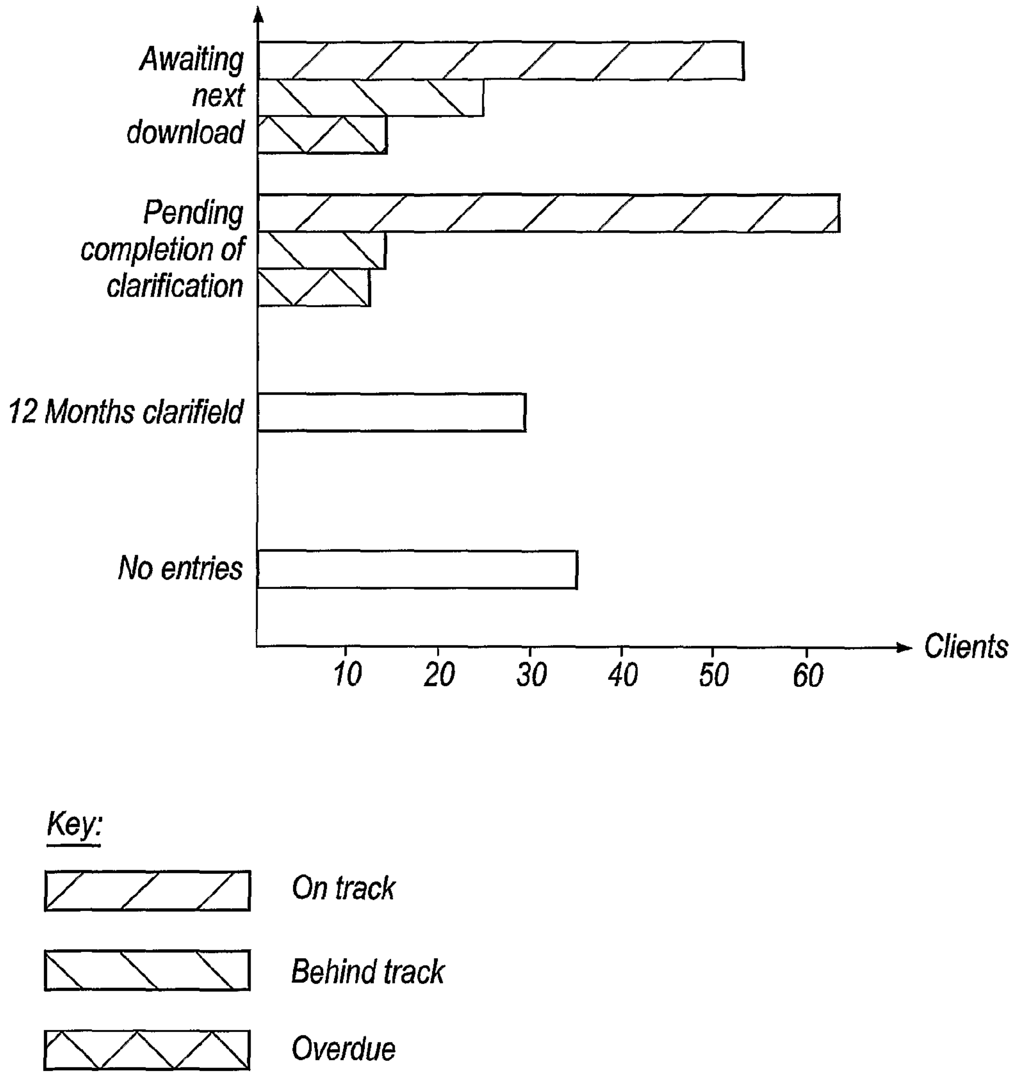
FIG. 27 shows an exemplary output of a progress management algorithm in accordance with an aspect of the present invention.

FIG. 27 shows an exemplary output provided by a progress management algorithm in accordance with the present invention.

As shown in FIG. 27, information is displayed regarding whether certain criteria are "on track", "behind track" or "overdue". In one form of the invention, information is displayed using a bar chart having a traffic light representation in which a green bar represents data that is on track, an amber bar represents data that is behind track and a red bar represents data that is overdue.

In the example of FIG. 27, data is displayed indicating the number of clients for which the next download is on track, behind track or overdue, the number of clients for which the clarification of data is on track, behind track or overdue, the number of clients having no unclarified data in the previous 12 months of data, and the number of clients for which no entries appear for the previous 12 months. In one form of the invention, actual numbers for "12 months clarified" and "no entries" are displayed in blue and purple respectively.

The example of FIG. 27 concerns a number of companies having a program for organising financial data of the form described above. Data, such as bank account data, must be regularly downloaded from a bank and any unclarified data must be clarified.

A management-set period is provided for downloading the required data. By way of example, data may be required to be downloaded quarterly. In one form of the invention, a leeway of perhaps five days is allowed. For example, the next download date may be 31 March (the end of a financial quarter) and data may be downloaded up to 5 April, whilst still being deemed to be "on track". A further period may be given, of five days for example, for clarifying data, so that data may be clarified up to 10 April, whilst still being deemed to be "on track".

In the example described below, the next download is said to be "behind track" for the period between the end of the download leeway period and the end of the clarification leeway period (i.e. between 5 and 10 April in the example given above) and is said to be "overdue" after the download leeway period and the clarification leeway period have passed (i.e. after 10 April in the example given above).

In order to determine the status of the next download of data function, the following algorithm is performed:

1. Is the next download date for the client in the future? If it is, the awaiting next download function for that client is on track. If it is not, proceed to step 2.
2. Is today's date later than the next download date, plus a download leeway period? If it is not, the awaiting next download function for that client is on track. If it is, proceed to step 3.
3. Is today's date later than the next download date, plus the download leeway period, plus a clarification leeway period? If it is not, the awaiting next download function is behind track. If it is, the awaiting next download function is overdue.

In order to determine the status of the pending completion of clarification function, the following algorithm is performed:

1. Are there any outstanding unclarified entries? If not, then the function is on track. If there are, proceed to step 2.
2. Is today's date later than the next download due date, plus the download leeway period plus the clarification leeway period? If it is not, then the function is on track. If it is, proceed to step 3.
3. Is today's date later than the next download due date, plus the download leeway period plus twice the clarification leeway period? If it is not, then the function is behind track. If it is, then the function is overdue.

The 12 months clarified function simply asks whether there are any entries in the last 12 months and, if so, asks whether there are any unclarified entries in the previous 12 months, with the bar chart visually representing the number of clients for which the are no unclarified entries in that period.

The no entries function simply gives a visual representation of the number of clients for which no entries have been made in the previous 12 months. This lack of activity can then be examined. For example, the lack of activity may be because the program of the present invention is not actually being used.

Unlike traditional systems, which normally only measure updated dates, the progress management algorithm of the present invention measures actions against time based criteria set by the management of the business for various tasks.

Normally, a manager would only have two options to provide this type of information:

1. Physically review the files of every client and assess hard copy records; or
2. Electronically measure dates. In this case an employee could give a false impression of work completed by merely altering target dates, i.e. not actually complete the defined tasks In both these circumstances, the records would have to be collated for each different task being measured and then amalgamated into a meaningful format.

The progress management algorithm described measures four distinct types of data, with the resultant data fed into a single graph, thereby producing a snapshot of various aspects of a business. The User is able to drill down into any component of the graph (by double-clicking) to display a schedule of the clients represented by that component.

In addition to the overview of the type shown in FIG. 27, the progress management algorithm may also be arranged to provide an automated diary system to pre-warn users of impending deadlines. By way of example, an operator may receive a diary reminder in the following cases:

1. A download is due.
2. A download is behind track.
3. A download is overdue.
4. A particular clarification is due.
5. A particular clarification is behind track.
6. A particular clarification is overdue.

The invention claimed is:

1. A method for producing accounting records, the method comprising the steps of:

obtaining electronic data from one or more secure, private and external data sources, said electronic data representing first financial data;

importing said electronic data into a computer program; and using said computer program to automatically create second financial data based on said first financial data, the second financial data being suitable for presentation to a user, wherein at least some of said electronic data is obtained without being manually entered by an operator, at least some of said first financial data comprises a plurality of transactions and at least some of said second financial data is in the form of a statement of account for an existing account and is not application data for establishing a new banking account; and wherein the step of creating said second financial data includes the steps of, for each transaction, automatically identifying one of a plurality of user-designated accounts to which the transaction belongs as a function of data generated by a financial institution that generated a transaction record associated with the transaction and allocating that transaction to the identified account and, in the case that an account cannot be identified, making a note in a record.

2. A method as claimed in claim 1, wherein at least some of said electronic data is downloaded via a communications link.

3. A method as claimed in claim 2, wherein said communications link is a wireless communications link.

4. A method as claimed in claim 1, wherein at least some of said first financial data is stored at one or more financial institutions.

5. A method as claimed in claim 4, wherein the importing step is carried out automatically, without requiring operator intervention.

6. A method as claimed in claim 1, wherein all of said first financial data is bank account transaction data.

7. A method as claimed in claim 1, wherein all of said first data is credit card account transaction data or bank account transaction data.

8. A method as claimed in claim 1, wherein said electronic data includes data obtained by cheque imaging.

9. A method as claimed in claim 8, wherein said cheque imaging step includes reading one or more markings made on said cheque using a scanner.

10. A method as claimed in claim 8, wherein said cheque imaging step makes use of optical character recognition technology.

11. A method as claimed in claim 1, further comprising the steps of specifying one or more data headings and allocating at least some of said second financial data to one or more of said headings.

12. A method as claimed in claim 11, wherein second financial data having the same format as previously allocated second financial data is automatically allocated to the same heading as said previously allocated second financial data.

13. A method as claimed in claim 11, further comprising the step of specifying a set of contacts for each heading, the method further comprising the step of allocating at least some of said second financial data to one or more of said contacts.

14. A method as claimed in claim 13, wherein data having the same format as previously allocated second financial data is automatically allocated to the same contact as the previously allocated second financial data.

15. A method as claimed in claim 1, further comprising the step of performing historical analysis on said second financial data.

16. A method as claimed in claim 15, wherein said historical analysis generates a month-on-month analysis of all income and expenditure with opening and closing balances calculated from all transaction data for each month.

17. A method as claimed in claim 15, wherein said historical analysis provides a schedule of entries for each heading.

18. A method as claimed in claim 15, wherein said historical analysis provides a breakdown of all entries where VAT is paid and where VAT is payable.

19. A method as claimed in claim 18, wherein said historical analysis calculates a VAT return for a period specified by a user.

20. A method as claimed in claim 1, further comprising the step of performing future analysis on said second financial data.

21. A method as claimed in claim 20, wherein a user specifies a past period indicating the data to be used to generate said future analysis and a future period for which said future analysis is to be generated.

22. A method as claimed in claim 1, wherein, for one or more of said headings, the user specifies an expected percentage difference in the income or expenditure for said future period compared with said past period.

23. A method as claimed in claim 21, wherein, for one or more of said headings, the user specifies an expected percentage difference in the income or expenditure for separate sub-periods of said future period compared with corresponding sub-periods of said past period.

24. A method as claimed in claim 21, wherein, for one or more of said headings, the user specifies an expected absolute difference in the income or expenditure for separate sub-periods of said future period compared with corresponding sub-periods of said past period.

25. A method as claimed in claim 21, wherein, for one or more of said headings, the user specifies an absolute expected value for the income or expenditure for one or more sub-periods of said future period compared with corresponding sub-period(s) of said past period.

26. A method as claimed in claim 13, wherein each contact is an income contact, an expenditure contact or a no invoice contact.

27. A method as claimed in claim 26, wherein, in response to an attempt to raise an invoice against an expenditure contact, an income contact is generated having the same details as said expenditure contact and the said invoice is raised against that income contact, provided that such an income contact does not already exist.

28. A method as claimed in claim 26, wherein, in response to an attempt to receive an invoice against an income contact, an expenditure contact is generated having the same details as said income contact and the said invoice is received against that expenditure contact, provided that such an expenditure contact does not already exist.

29. A method as claimed in claim 1, wherein said first financial data includes data relating to a plurality of accounts.

30. A method as claimed in claim 29, wherein said first financial data comprises a plurality of transactions, each transaction relating to a single account, the method further comprising the steps of, for each transaction, identifying the account to which the transaction belongs and allocating that transaction to the identified account.

31. A method as claimed in claim 29, wherein said first financial data includes a closing balance for each of said accounts.

32. A method as claimed in claim 31, wherein, for each account, the closing balance indicated by said first financial data is checked against a closing balance calculated after said transactions are applied to each account.

33. A method as claimed in claim 1, wherein said electronic data is stored in a standard format.

34. An apparatus for producing accounting records comprising:

means for importing electronic data from one or more data sources, said electronic data representing first financial data;

means for invoice control for raising and receiving of invoices and tracking payment of the invoices against the bank entries; and means for automatically creating second financial based on said first financial data, the second financial data being suitable for presentation to a user, wherein at least some of said electronic data is obtained without being manually entered by an operator, at least some of said first financial data comprises a plurality of transactions and at least some of said second financial data is in the form of a statement of account;

wherein the step of creating said second financial data includes the steps of, for each transaction, automatically identifying one of a plurality of user-designated accounts to which the transaction belongs as a function of data generated by a financial institution that generated a transaction record associated with the transaction and allocating that transaction to the identified account and, in the case that an account cannot be identified, making a note in a record.

35. A non-transitory computer executable program tangibly embodied on a computer readable medium for producing accounting records comprising:

means for importing electronic data from one or more data sources, said electronic data representing first financial data; and means for automatically creating second financial based on said first financial data, the second financial data being suitable for presentation to a user, wherein at least some of said electronic data is obtained without being manually entered by an operator, and at least some of said second financial data is in the form of a statement of account;

wherein the step of creating said second financial data includes the steps of, for each transaction, automatically identifying one of a plurality of user-designated accounts to which the transaction belongs as a function of data generated by a financial institution that generated a transaction record associated with the transaction and allocating that transaction to the identified account and, in the case that an account cannot be identified, making a note in a record.

* * * * *

UNITED STATES PATENT AND TRADEMARK OFFICE

CERTIFICATE OF CORRECTION

PATENT NO. : 8,566,232 B2
APPLICATION NO. : 11/662329
DATED : October 22, 2013
INVENTOR(S) : Paul Bater It is certified that error appears in the above-identified patent and that said Letters Patent is hereby corrected as shown below:

In the Claims

Column 22, line 46, replace “1” with “21”

Signed and Sealed this
Eighteenth Day of February, 2014

Michelle K. Lee
*Deputy Director of the United States Patent and Trademark Office*